(12) United States Patent
Sakagawa et al.

(10) Patent No.: US 7,492,362 B2
(45) Date of Patent: Feb. 17, 2009

(54) VIRTUAL SPACE RENDERING/DISPLAY APPARATUS AND VIRTUAL SPACE RENDERING/DISPLAY METHOD

(75) Inventors: Yukio Sakagawa, Tokyo (JP); Akihiro Katayama, Kanagawa (JP); Masahiro Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1192 days.

(21) Appl. No.: 10/618,610

(22) Filed: Jul. 15, 2003

(65) Prior Publication Data

US 2007/0109296 A1 May 17, 2007

(30) Foreign Application Priority Data

Jul. 19, 2002 (JP) .............................. 2002-211122

(51) Int. Cl.
*G06T 15/00* (2006.01)
*G06F 3/01* (2006.01)
*G06F 3/48* (2006.01)
*G09G 5/00* (2006.01)

(52) U.S. Cl. ................... 345/419; 345/619; 715/700; 715/757; 715/782; 715/848

(58) Field of Classification Search ......... 715/585–856, 715/859–860, 863; 345/419, 427, 632, 633, 345/619, 581, 650–653, 629, 683, 156–157, 345/161, 167–168
See application file for complete search history.

(56) References Cited

U.S. PATENT DOCUMENTS

| | | | |
|---|---|---|---|
| 5,572,239 | A | 11/1996 | Jaeger |
| 5,878,161 | A | 3/1999 | Ishida et al. |
| 6,185,341 | B1 | 2/2001 | Ishida |
| 6,191,773 | B1 * | 2/2001 | Maruno et al. ............... 345/158 |

(Continued)

FOREIGN PATENT DOCUMENTS

JP 9-81032 A1 3/1997

(Continued)

OTHER PUBLICATIONS

Office action dated Aug. 24, 2007, for corresponding Japanese Patent Application No. 2002-211122.

(Continued)

*Primary Examiner*—Wesner Sajous
(74) *Attorney, Agent, or Firm*—Fitzpatrick, Cella, Harper & Scinto

(57) ABSTRACT

A view image rendering module (102) generates an image of a virtual space on the basis of a first viewpoint indicating the viewpoint of a user on the virtual space, and displays the generated image on a view image presentation module (101). A map image rendering module (104) generates a map image indicating a region around the position of the first viewpoint on the virtual space, and displays the generated map image on a map image presentation module (103). The position of the first viewpoint and the visual axis direction are controlled using a viewpoint position•visual axis direction input module (106) which is provided on the display surface of the map image presentation module (103). Furthermore, a virtual object set on the virtual space undergoes manipulation control using a virtual object manipulation input module (107) which is provided on the display surface of the map image presentation module (103).

8 Claims, 26 Drawing Sheets

U.S. PATENT DOCUMENTS

| | | |
|---|---|---|
| 6,200,138 B1 * | 3/2001 | Ando et al. .................... 434/61 |
| 6,226,008 B1 * | 5/2001 | Watanabe et al. ........... 345/427 |
| 6,252,602 B1 | 6/2001 | Matsuda et al. |
| 6,286,387 B1 * | 9/2001 | Adachi et al. ............ 74/490.12 |
| 6,377,277 B1 * | 4/2002 | Yamamoto ................. 345/629 |
| 6,400,373 B1 | 6/2002 | Uchiyama et al. |
| 6,445,807 B1 * | 9/2002 | Katayama et al. ........... 382/100 |
| 2001/0055039 A1 * | 12/2001 | Matsuda ..................... 345/848 |
| 2003/0179198 A1 * | 9/2003 | Uchiyama ................... 345/427 |
| 2003/0201973 A1 * | 10/2003 | Gould et al. ................ 345/156 |
| 2004/0108992 A1 * | 6/2004 | Rosenberg ................. 345/156 |
| 2005/0174361 A1 * | 8/2005 | Kobayashi et al. .......... 345/633 |
| 2005/0195332 A1 * | 9/2005 | Sakagawa et al. ........... 348/578 |
| 2006/0232605 A1 * | 10/2006 | Imamura ................... 345/619 |

FOREIGN PATENT DOCUMENTS

| | | |
|---|---|---|
| JP | 09-505163 A1 | 5/1997 |
| JP | 10-111776 A1 | 4/1998 |
| JP | 2000-348079 A1 | 12/2000 |
| JP | 2001-46743 A1 | 2/2001 |
| JP | 2001-216527 A1 | 8/2001 |
| JP | 2002-23956 A1 | 1/2002 |

OTHER PUBLICATIONS

Yamamoto et al., "A Fireworks Production Support System Using Fireworks Videos", Graduate School of Information Science, Nara Institute of Science and Tech., Japan, vol. 26, No. 9, pp. 55-60.

Yoshimori et al., "Combination of Two-and Three-Dimensional Space for Solid Modeling", Graduate School of Information Science, Nara Institute of Science and Tech., Japan, vol. 99, No. 647, pp. 13-18.

* cited by examiner

F I G. 3
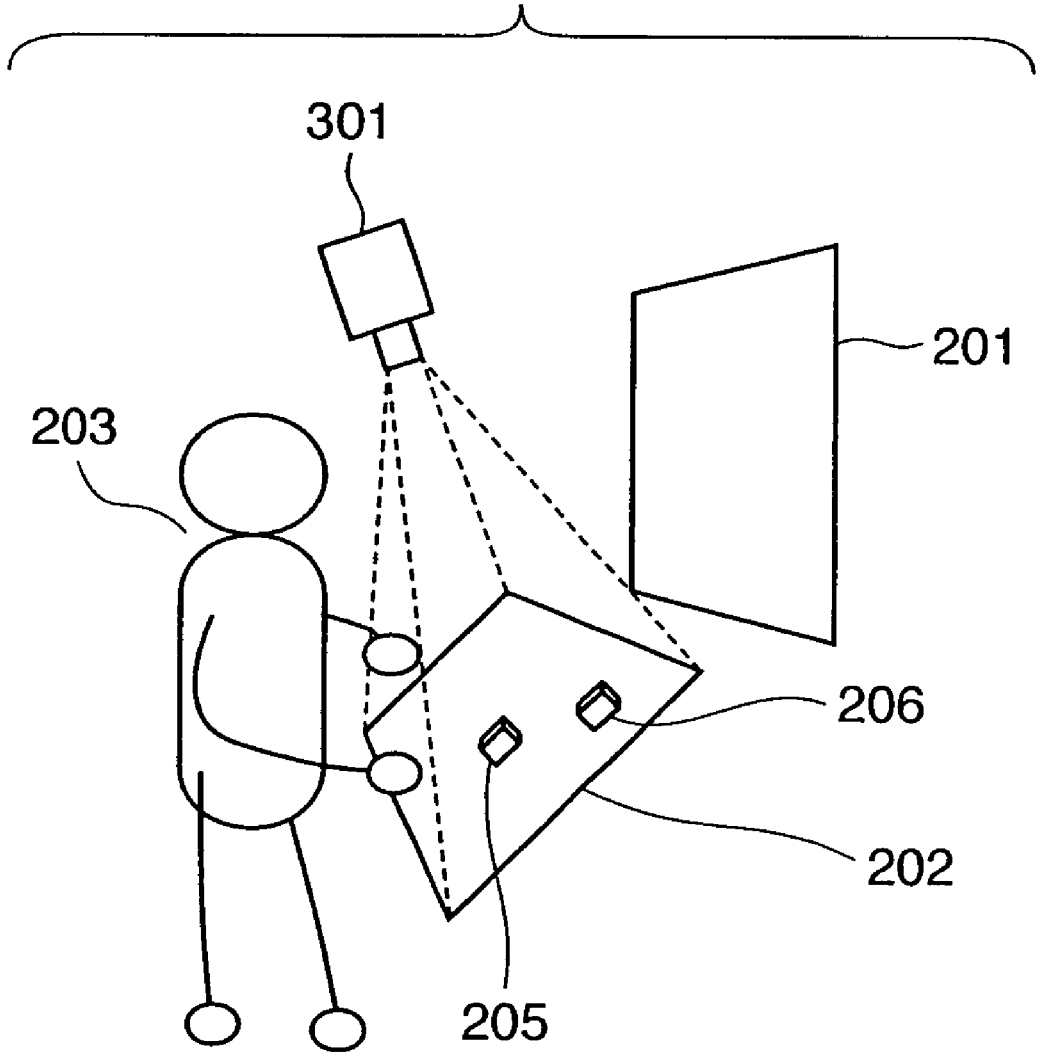

F I G. 5
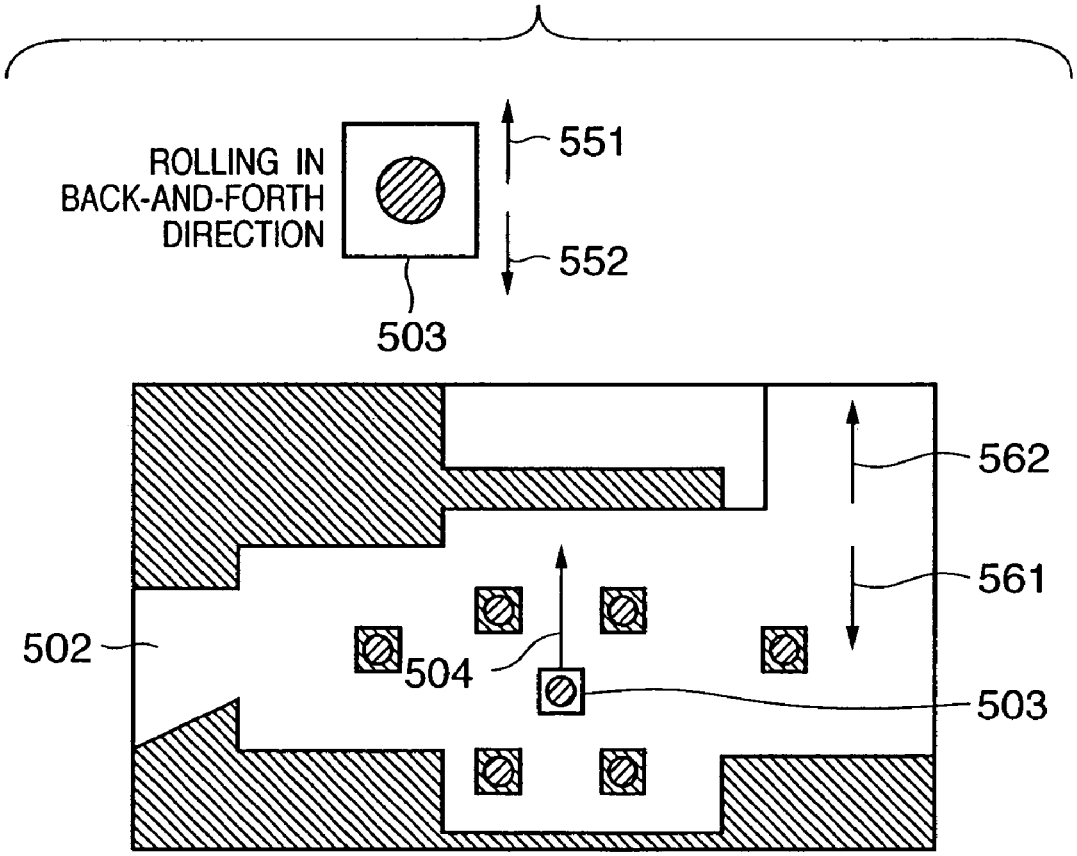

901 — PRESENT TOP SURFACE OF TABLE

902 — PRESENT FOUR LEGS OF TABLE

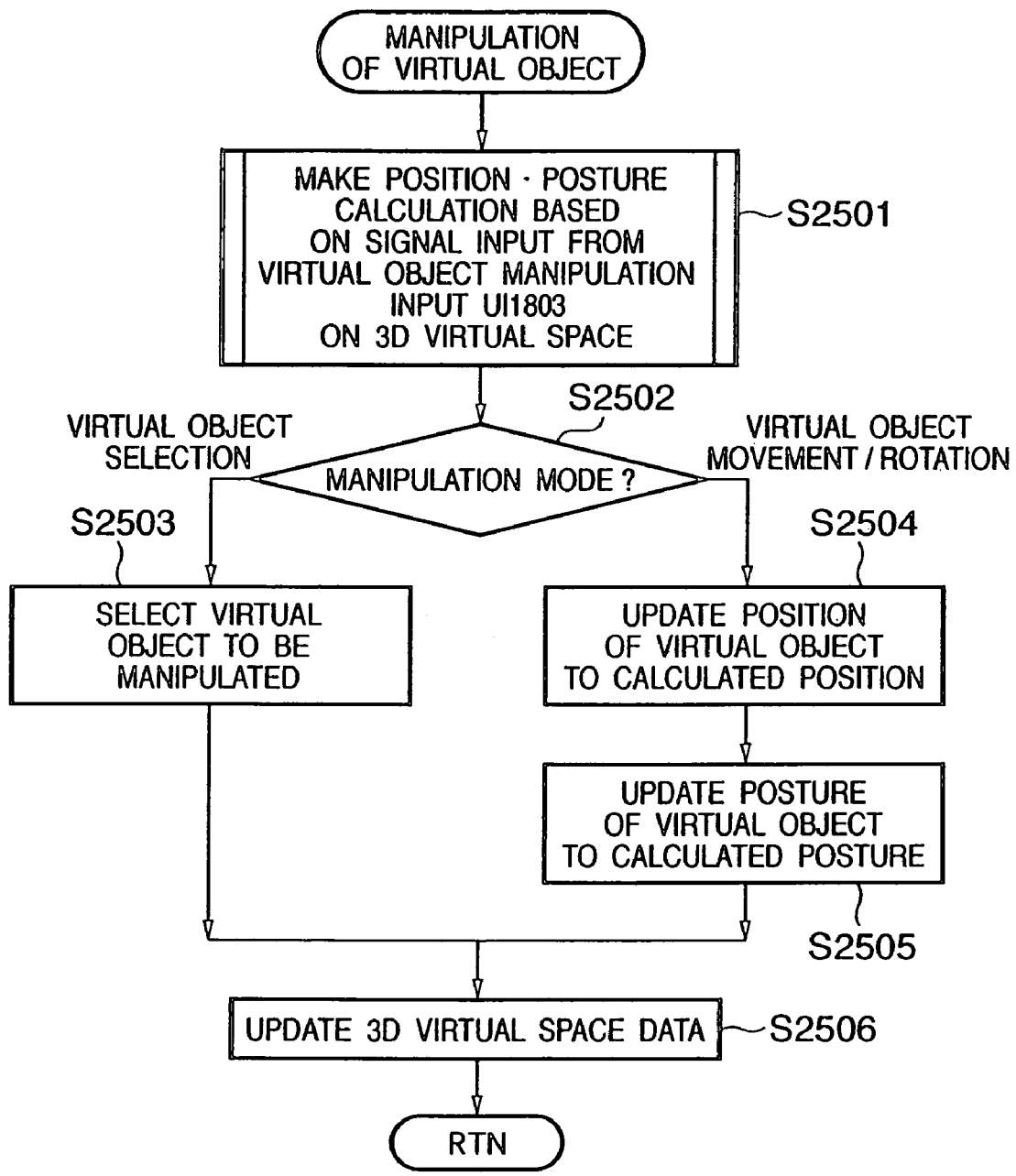

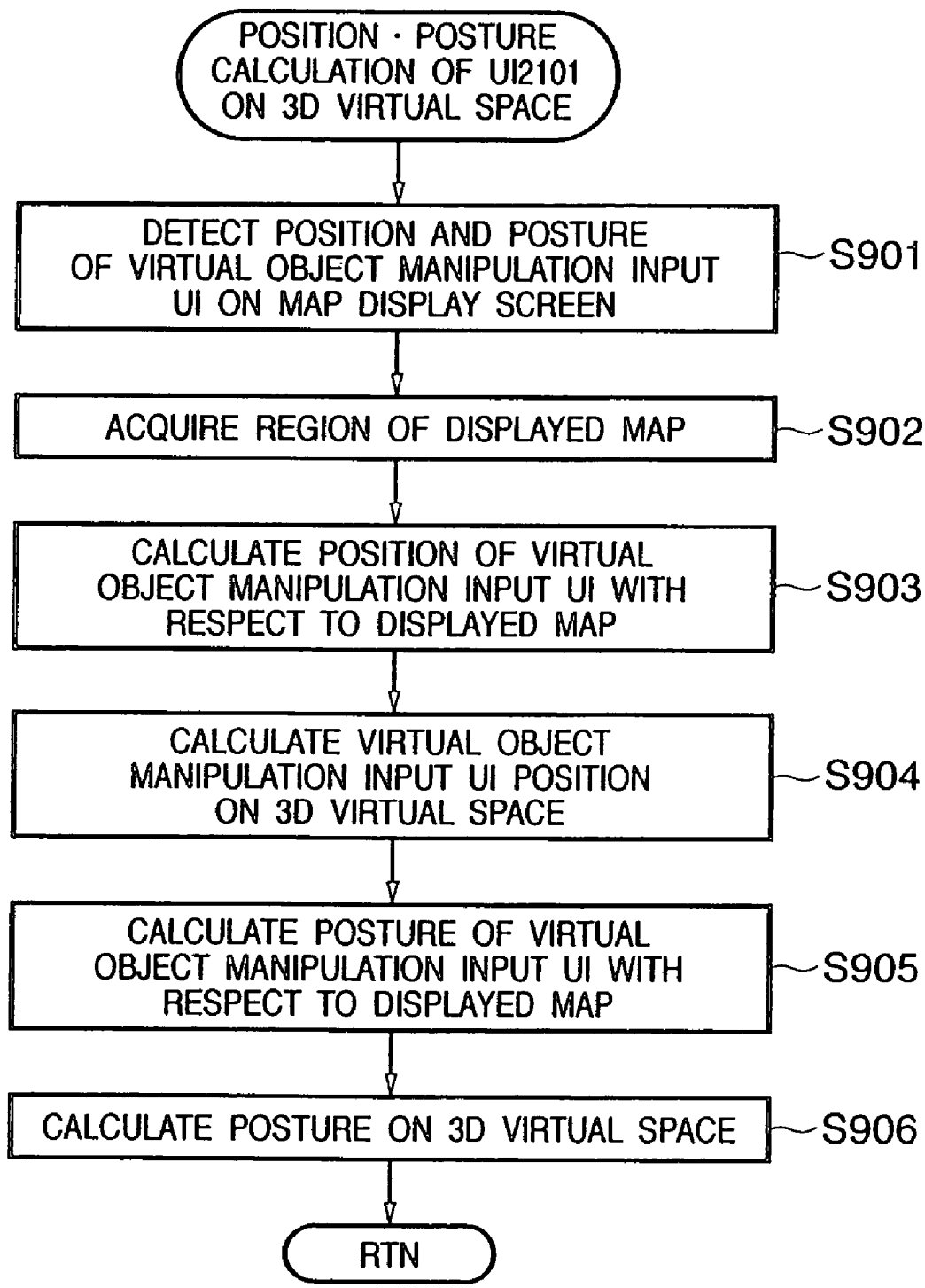

VIRTUAL SPACE RENDERING/DISPLAY APPARATUS AND VIRTUAL SPACE RENDERING/DISPLAY METHOD

FIELD OF THE INVENTION

The present invention relates to a virtual space rendering/display apparatus and virtual space rendering/display method, which allow a user to experience a virtual space.

BACKGROUND OF THE INVENTION

Three-dimensional (3D) computer graphics (CG) techniques have rapidly prevailed along with the improvement of performance of recent computers. In combination with such techniques, VRML (Virtual Reality Modeling Language) has been standardized and widely used as a language that handles a 3D virtual space. The latest VRML2.0 (ISO/IEC 14772-1: 1997) which is open to the public at this time is used to construct a virtual mall for electronic commerce, to manage 3D data for CAD or the like on an intranet, and the like.

The user observes an image on a 3D virtual space described in VRML or the like in accordance with the viewpoint position or visual axis direction set in the virtual space using a two-dimensional (2D) view window. More specifically, the user changes viewpoint position information and visual axis direction information by moving a cursor on the 2D view window using a mouse, flipping a joystick two-dimensionally, or rolling a trackball.

As a result, an apparatus for presenting an image on the virtual space to the user changes the viewpoint position and visual axis direction in correspondence with the viewpoint position information and visual axis direction information, which have been changed, generates an image on the virtual space corresponding to the changed viewpoint position and visual axis direction, and presents the generated image to the user. The user can walk through the 3D virtual space by sequentially changing the viewpoint position information and visual axis direction information in this way.

If a manipulative virtual object is present on the 3D virtual space, the user manipulates that virtual object by moving the cursor on the 2D view window onto the virtual object to be manipulated, and selecting that object while pressing an arbitrary key at the same time or switching a manipulation mode.

However, according to the conventional method, the field of view (field angle) from the viewpoint on the 3D virtual space is limited, and the user cannot easily recognize the current location of the viewpoint position on the 3D virtual space on the 2D view window.

Also, the viewpoint is present as an object having a certain size on the 3D virtual space. In this case, this object sometimes collides against an obstacle on the 3D virtual space. However, if the viewpoint collides against an obstacle during walkthrough, the viewpoint position can no longer be moved in the direction of the obstacle. In such case, since the obstacle often falls outside the field of view depending on its position, the user cannot often recognize why he or she cannot change the viewpoint position.

Furthermore, a virtual object on the 3D virtual space can be manipulated using the cursor on the 2D view window, as described above. If another manipulative object is present between the position of the virtual object to be manipulated and the viewpoint position, it is difficult to manipulate that virtual object.

The present invention has been made in consideration of the aforementioned problems, and has as its object to provide a virtual space rendering/display apparatus and virtual space rendering/display method, which allow the user to walk through a 3D virtual space and to manipulate a virtual object more easily.

SUMMARY OF THE INVENTION

In order to achieve the above object, for example, a virtual space rendering/display apparatus of the present invention comprises the following arrangement.

That is, a virtual space rendering/display apparatus comprising; first generation means for generating an image of a virtual space on the basis of a first viewpoint indicating a viewpoint of a user on the virtual space; first display means for displaying the image of the virtual space generated by the first generation means; second generation means for generating a map image indicating a region around a position of the first viewpoint on the virtual space; second display means for displaying the map image generated by the second generation means; viewpoint position•visual axis direction control means, provided on a display screen of the second display means, for controlling the position and a visual axis direction of the first viewpoint; and manipulation control means, provided on a display screen of the second display means, for making manipulation control of a virtual object set on the virtual space.

In order to achieve the above object, for example, a virtual space rendering/display method of the present invention comprises the following arrangement.

That is, a virtual space rendering/display method comprising: a first generation step of generating an image of a virtual space on the basis of a first viewpoint indicating a viewpoint of a user on the virtual space; a second generation step of generating a map image indicating a region around a position of the first viewpoint on the virtual space; a viewpoint position•visual axis direction control step of controlling the position and a visual axis direction of the first viewpoint using viewpoint position•visual axis direction control means provided on a display screen of a display unit that displays the map image; and a manipulation control step of making manipulation control of a virtual object set on the virtual space using manipulation control means provided on the display screen of the display unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 illustrates a virtual space rendering/display apparatus using front projection;

FIG. 5 is a view showing a viewpoint position control method using a trackball 503;

FIG. 25 is a flow chart showing details of the process in step S2204; and FIG. 26 is a flow chart showing details of the process in step S2501.

DETAILED DESCRIPTION OF THE PREFERRED EMBODIMENTS

Preferred embodiments of the present invention will now be described in detail in accordance with the accompanying drawings.

First Embodiment

A virtual space rendering/display apparatus according to this embodiment, which allows the user to experience a 3D virtual space, i.e., to experience walkthrough on the 3D virtual space and manipulation of a virtual object will be described first. Note that walkthrough is that the user browses the 3D virtual space by moving his or her viewpoint position, visual axis direction, and the like on the 3D virtual space.

The virtual space rendering/display apparatus according to this embodiment generates an image of the 3D virtual space using 3D virtual space data described in VRML. The apparatus generates a view image of the virtual space to be observed by the user in correspondence with the user's viewpoint position and visual axis direction on the virtual space, and a view image presentation device presents that image.

In order to allow the user to easily recognize his or her current position (viewpoint position) on the virtual space, an input device used to input the user's viewpoint position and visual axis direction on the virtual space is provided on a display device for displaying a 2D map image as a plan view of the 3D virtual space, and the viewpoint position•visual axis direction input device on that map inputs the user's current viewpoint position and visual axis direction.

In this embodiment as well, the viewpoint is expressed as an object having a certain size. If this object collides against a wall, table, or the like on the virtual space, the user can recognize the positional relationship between the object and an obstacle by observing a map around the viewpoint position•visual axis direction input device, and can avoid the obstacle by moving the object position using the viewpoint position•visual axis direction input device.

Also, a virtual object manipulation input device used to manipulate a virtual object is also provided on the map. If there is a virtual object to be manipulated, the user brings the virtual object manipulation input device closer to an virtual object image on the map to select the virtual object, and then manipulates (e.g., rotates, moves, or the like) the object. The 3D virtual space data is not limited to a geometric model, and other data formats such as ray space data and the like may be used.

Figure 1:
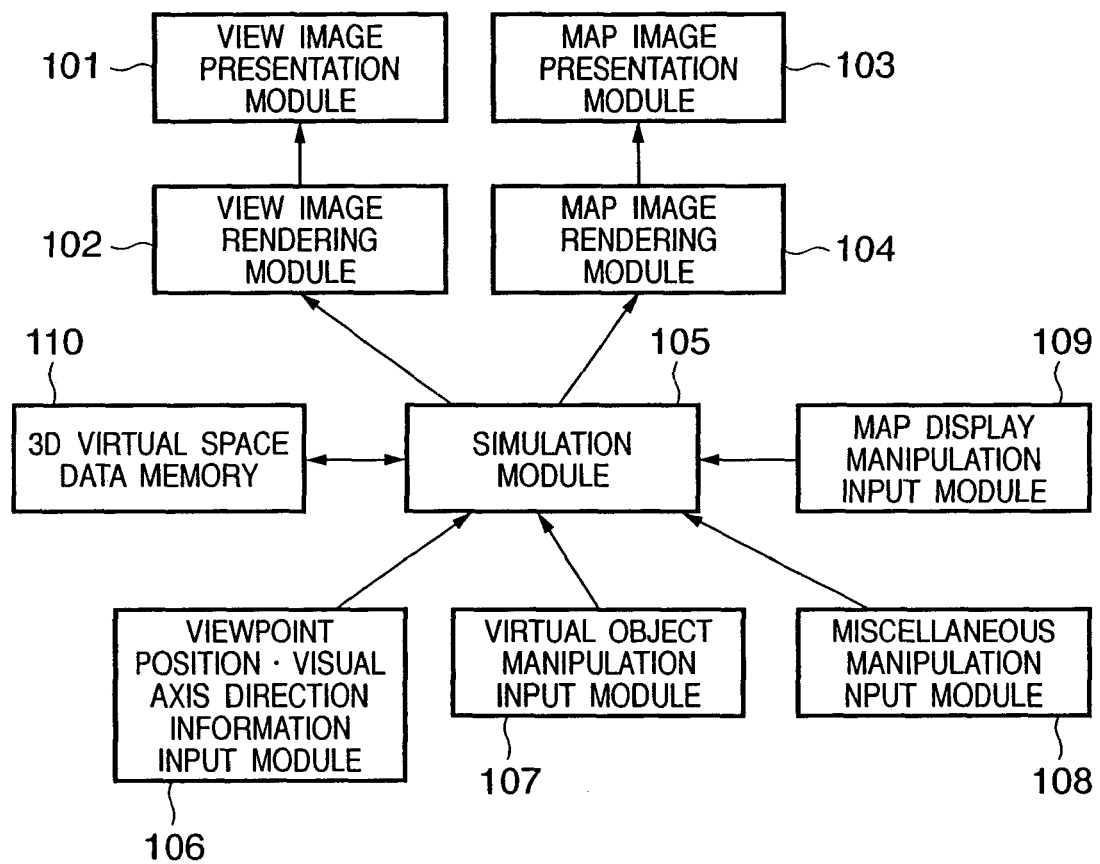
FIG. 1 is a block diagram for explaining the functional arrangement of a virtual space rendering/display apparatus according to the first embodiment of the present invention.
Figure 2:
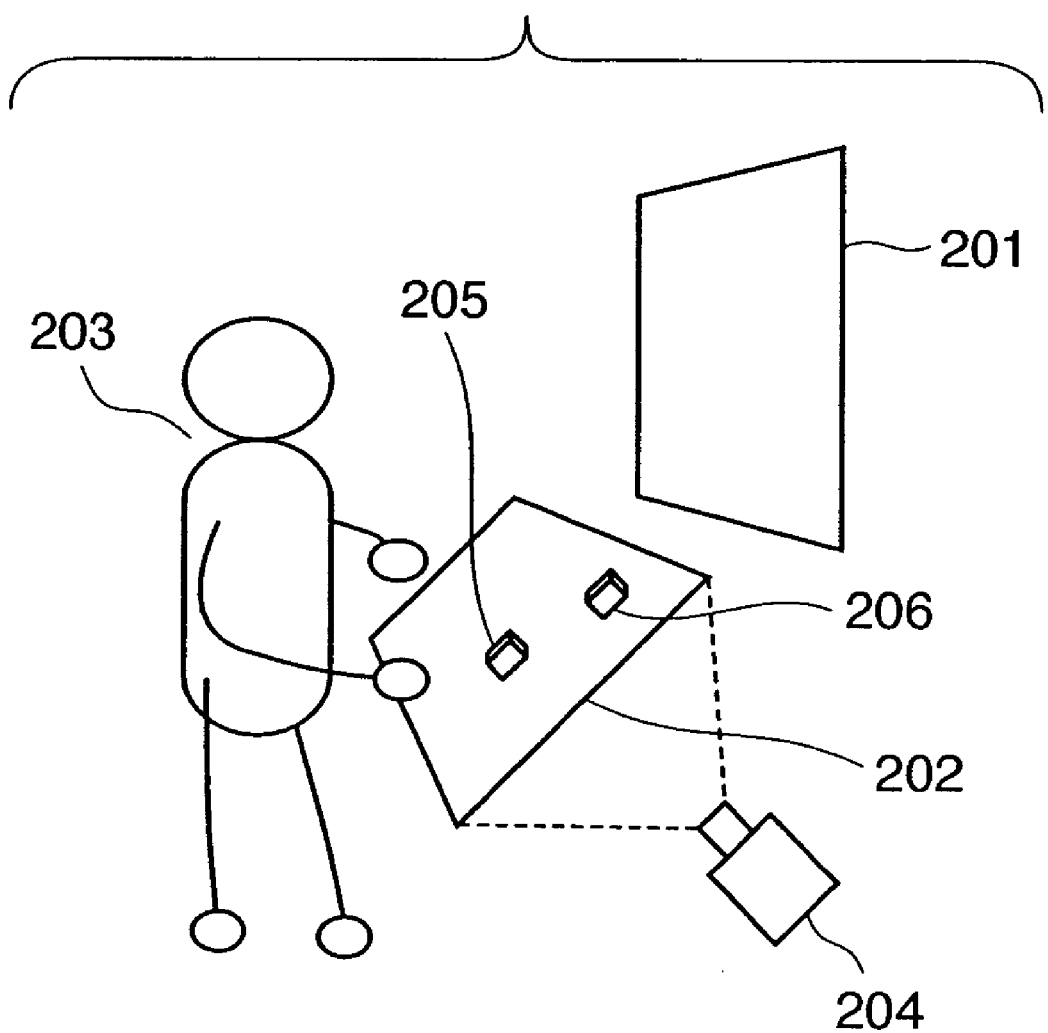
FIG. 2 illustrates a state wherein the user operates the virtual space rendering/display apparatus according to the first embodiment of the present invention.

FIG. 1 is a block diagram showing the functional arrangement of the virtual space rendering/display apparatus according to this embodiment, which allows the user to experience a 3D virtual space, i.e., to experience walkthrough on the 3D virtual space and manipulation of a virtual object. FIG. 2 shows a state wherein the user operates the virtual space rendering/display apparatus of this embodiment.

The virtual space rendering/display apparatus according to this embodiment will be described below using FIGS. 1 and 2.

A view image presentation module 101 presents an image on a virtual space in correspondence with the viewpoint position and visual axis direction input by the user. The view image presentation module 101 is not particularly limited as long as it is a medium that can display an image. For example, a projector and screen, CRT, liquid crystal display, and the like can be used. Also, a stereoscopic image display device may be used. Also, the module 101 may have one or a plurality of display screens. In this embodiment, assume that the field angle from the viewpoint of the user on the virtual space is fixed. However, the field angle may dynamically change. A view image presentation device 201 shown in FIG. 2 is one example.

A view image rendering module 102 generates an image on the virtual space falling within the field of view from the viewpoint on the virtual space on the basis of 3D virtual space data. The 3D virtual space data is stored in a 3D virtual space data memory 110.

A simulation module 105 executes main processes associated with walkthrough such as a determination process for determining a portion of the 3D virtual space to be presented as a view image to the user, a collision check process for checking collision between an object indicating the viewpoint and obstacles arranged on the virtual space during walkthrough, and the like. For example, the user can change the position and posture of a virtual object using a manipulation unit (to be described later). In this case, the simulation module 105 reflects that manipulation result on the 3D virtual space data, and always stores the latest state in the 3D virtual space data memory 110.

Also, the simulation module 105 selects 3D virtual space data indicating a region around the user's viewpoint position from those stored in the 3D virtual space data memory 110, and sends the selected data to a map image rendering module 104 so as to generate a map image (to be described later). The map image rendering module 104 generates a map image of a virtual space indicating the region around the user's viewpoint position using the received 3D virtual space data.

A map image presentation module 103 presents the map image generated by the map image rendering module 104. On the map image presentation module 103, a user interface (UI) as a device for inputting viewpoint position•visual axis direction information, and a UI as a device for inputting a manipulation instruction for a virtual object are arranged.

FIG. 2 shows a map image presentation device 202 using a projector 204, which serves as the map image presentation module 103. FIG. 2 illustrates a back projection system in which the projector 204 projects an image onto the back surface of the display screen of the map image presentation device 202. Also, a front projection system may be used, and FIG. 3 shows a virtual image rendering/display apparatus in such case. FIG. 3 illustrates a front projection system in which a projector 301 projects the front surface of the display screen of the map image presentation device 202.

Figure 4:
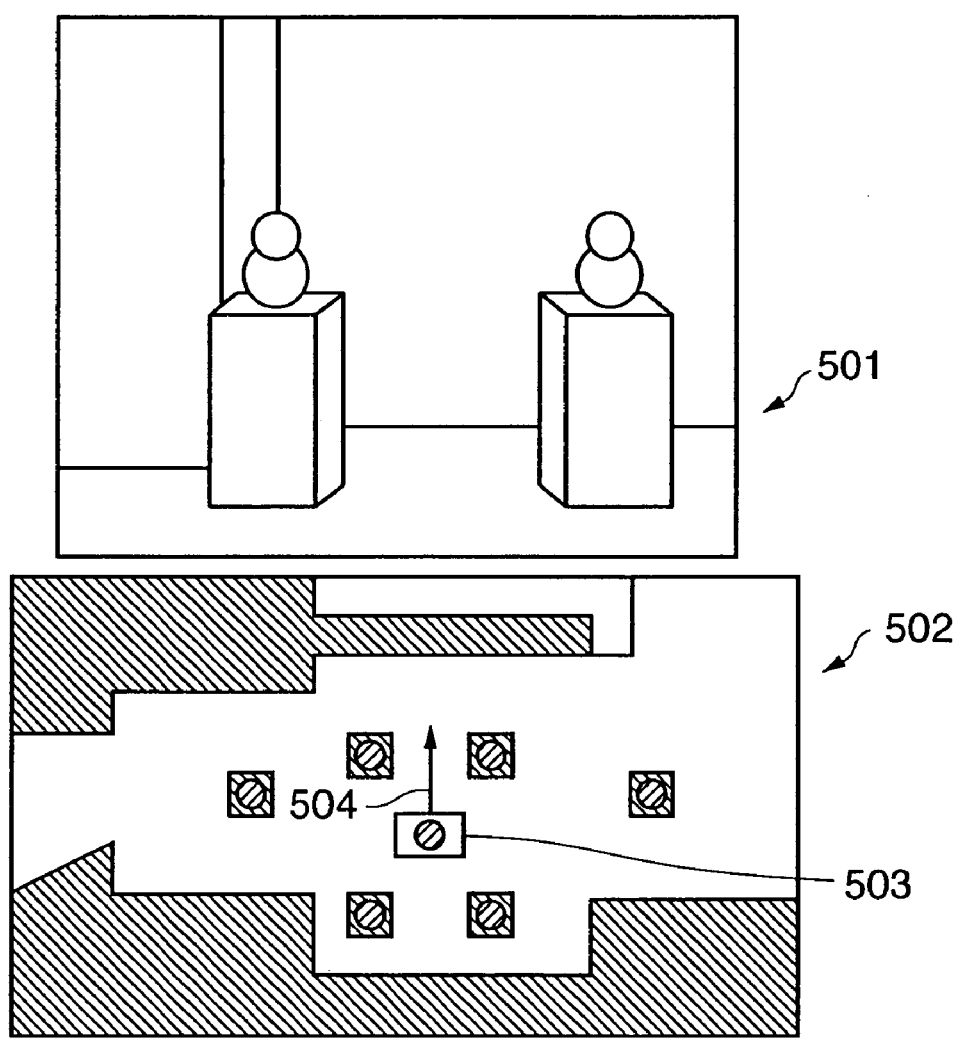
FIG. 4 shows a view image 501 as an example of a view image to be presented on a view image presentation device 201, a map image 502 as an example of a map image to be presented on the display screen of a map image presentation device 202, and a viewpoint position•visual axis direction input UI 503 on the map image 502 as an example of a viewpoint position•visual axis direction input UI 205.

FIG. 4 shows a view image 501 as an example of a view image to be presented on the view image presentation device 201, a map image 502 as an example of a map image to be presented on the display screen of the map image presentation device 202, and a viewpoint position•visual axis direction input UI 503 on the map image 502 as an example of a viewpoint position•visual axis direction input UI 205. In FIG. 4, the UI as the device for inputting a manipulation instruction for a virtual object is not shown for the sake of simplicity.

In this embodiment, assume that a trackball is used as the viewpoint position•visual axis direction input UI 503, the position of the trackball on the display screen of the map image presentation device 202 indicates the viewpoint position on the map, and the visual axis direction always points to the up direction on the display screen of the map image presentation device 202. Note that FIG. 4 illustrates an arrow 504 indicating the visual axis direction for the sake of simplicity. However, in order to allow the user to easily recognize the current visual axis direction, an image of the arrow 504 may be displayed on the display screen of the map image presentation device 202. Since the trackball has a fixed absolute position and direction on the display screen of the map image, the map image on the virtual space scrolls or rotates upon operation of the trackball.

Figure 6:
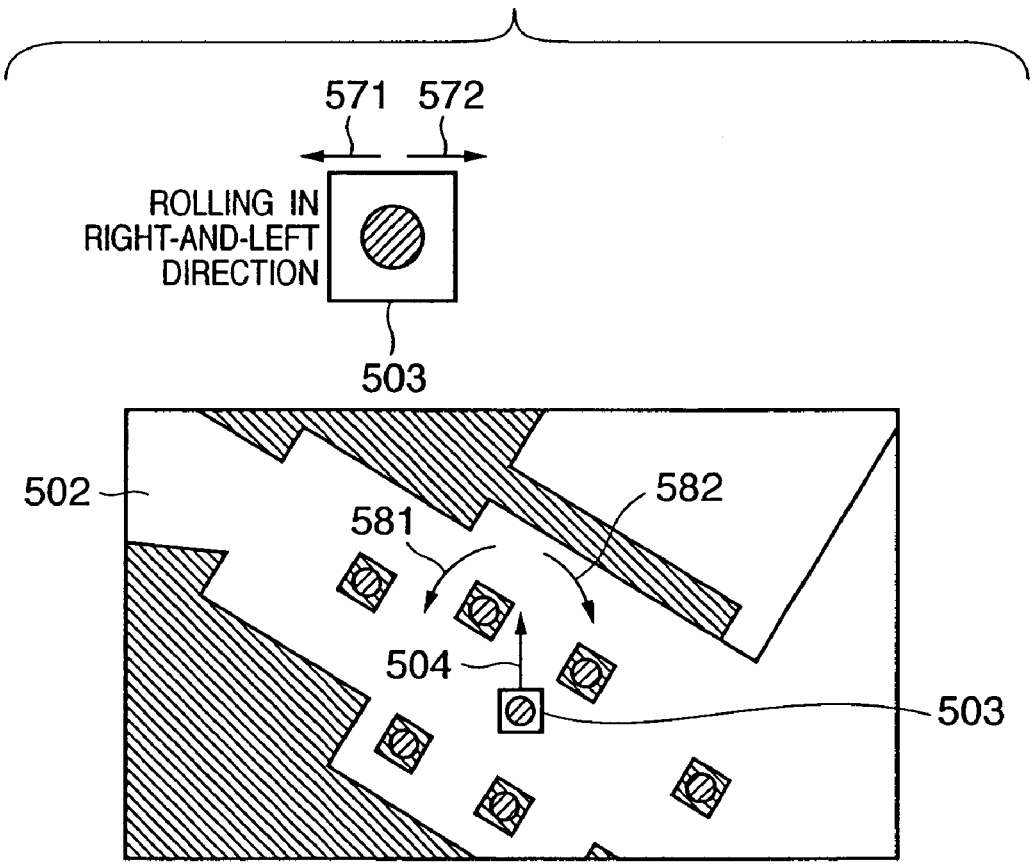
FIG. 6 is a view showing a visual axis direction control method using the trackball 503.

FIG. 5 is a view showing a viewpoint position control method using the trackball 503, and FIG. 6 is a view showing a visual axis direction control method using the trackball 503.

In FIGS. 5 and 6, the UI as the device for inputting a manipulation instruction for a virtual object is not shown for the sake of simplicity.

Referring to FIG. 5, by rolling the trackball 503 in, e.g., a direction 551, the map image 502 scrolls in a direction 562. In this way, the viewpoint positions moves upward on the map. On the other hand, by rolling the trackball 503 in a direction 552, the map image 502 scrolls in a direction 561. As a result, the viewpoint positions moves downward on the map.

On the other hand, referring to FIG. 6, by rolling the trackball 503 in, e.g., a direction 571, the map image 502 rotates in a direction 582 around the position of the trackball 503. In this way, since the absolute direction of the visual axis direction vector 504 remains unchanged on the display screen of the map image presentation device 202, but the pointing direction of that vector changes in the map image upon rotation of the map image, the visual axis direction points to the counterclockwise direction in the map image.

By rolling the trackball 503 in, e.g., a direction 572, the map image 502 rotates in a direction 581 around the position of the trackball 503. In this way, since the absolute direction of the visual axis direction vector 504 remains unchanged on the display screen of the map image presentation device 202, but the pointing direction of that vector changes in the map image upon rotation of the map image, the visual axis direction points to the clockwise direction in the map image.

The viewpoint position and visual axis direction can be controlled by the aforementioned control methods using the trackball 503. By combining these control methods, the viewpoint position can be arbitrarily moved on the map.

An image of the virtual space based on the viewpoint position and visual axis direction controlled by the viewpoint position•visual axis direction input UI 503 is presented as the view image 501 on the view image presentation device 201.

Note that FIGS. 5 and 6 have explained the control methods of the viewpoint position and visual axis direction using the trackball 503. However, the use method of the trackball is not limited to these specific methods. For example, by rolling the trackball in the right-and-left direction (direction 571 or 572), the viewpoint position may be moved sideways (traversed) or its height may be moved.

The viewpoint moving amount and viewpoint rotation amount may be variously changed in correspondence with the rolling amount of the trackball. For example, the moving speed of the viewpoint/the rotation speed of the visual axis direction may be changed in correspondence with the rolling amount of the trackball. In this case, the viewpoint position is moved/the visual axis direction is rotated while rolling the trackball. If the user does not roll the trackball, the viewpoint position and visual axis direction remain the same.

If the front projection system is adopted, as shown in FIG. 3, a special object image can be projected onto the trackball. For example, when an image of a camera itself is projected onto the trackball, it may give an impression of a "camera moving on the virtual space" to the user in place of the "trackball".

A virtual object manipulation input UI 206 which is used by the user to make various manipulations of a virtual object on the virtual space will be described below. In this embodiment, the trackball is also used as the virtual object manipulation input UI 206 in the same manner as the viewpoint position•visual axis direction input UI 205.

Figure 7:
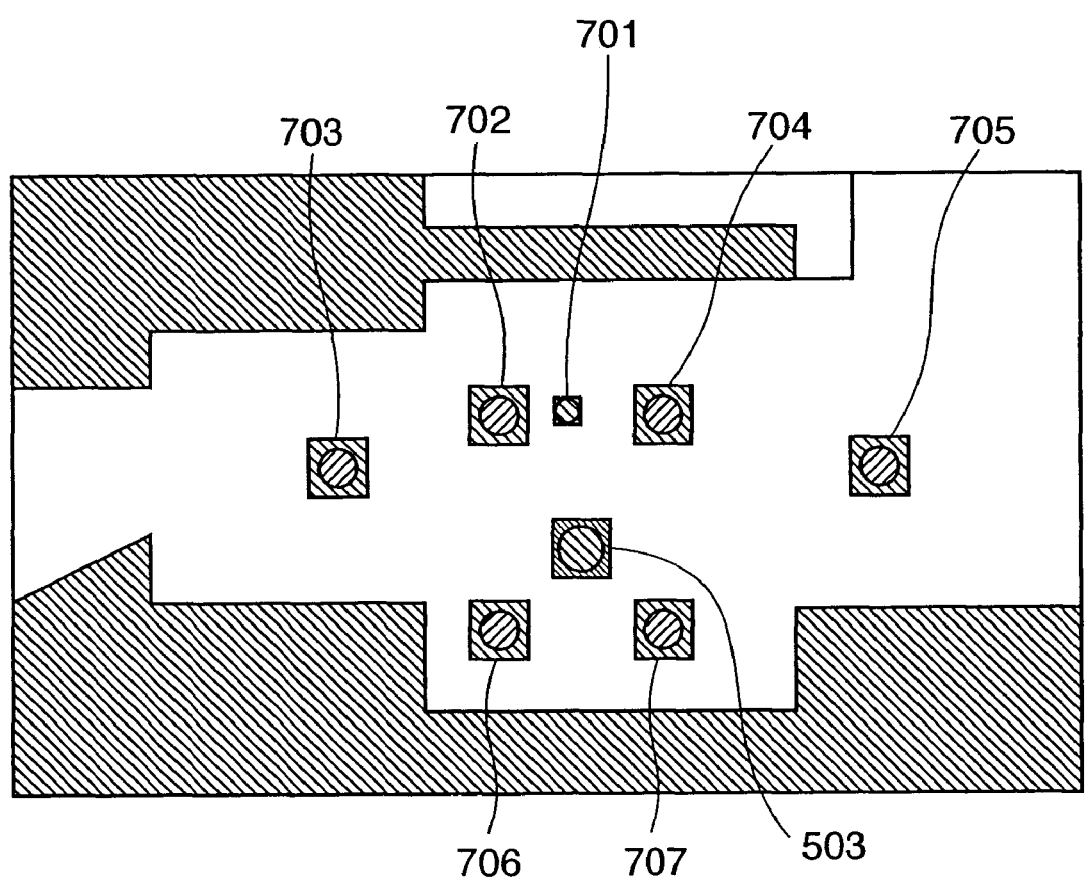
FIG. 7 shows a map image, and also shows the viewpoint position•visual axis direction input UI 503 provided on the map image presentation device 202 which presents this map image, and a virtual object manipulation input UI 701 serving as a virtual object manipulation input UI 206.

FIG. 7 shows the map image, and also shows the virtual object manipulation input UI 503 which is provided on the map image presentation device 202 that presents this map image, and a virtual object manipulation input UI 701 serving as the virtual object manipulation input UI 206. In this embodiment, the virtual object manipulation input UI 701 is fixed in position on the display screen of the map image.

Also, images indicating virtual objects on the virtual space are displayed on the map image. Each of these images may be an actual image of a virtual object, or may use an arbitrary mark. In FIG. 7, mark images (702 to 707) indicating virtual objects are displayed at positions where these virtual objects are present.

In this embodiment, a virtual object located at a position closest to the virtual object manipulation input UI 701 on the map image is selected as an object to be manipulated. Since the position of the virtual object manipulation input UI on the map image can be calculated, the closest virtual object can be detected by comparing the calculated position and the positions of individual virtual objects on the map image. In FIG. 7, a virtual object 702 is selected as an object to be manipulated.

After that, if there is another virtual object to be selected, the user selects that virtual object using the virtual object manipulation input UI. In order to allow the user to visually identify the selected virtual object, the color of the image of the selected virtual object may be changed, the image may be flickered, or a frame may be displayed.

If the map image presentation device 202 adopts a front projection type projector, it may project an image of the virtual object selected using the virtual object manipulation input UI 701. The image of the selected virtual object is manipulated using the virtual object manipulation input UI 701.

Figure 8:
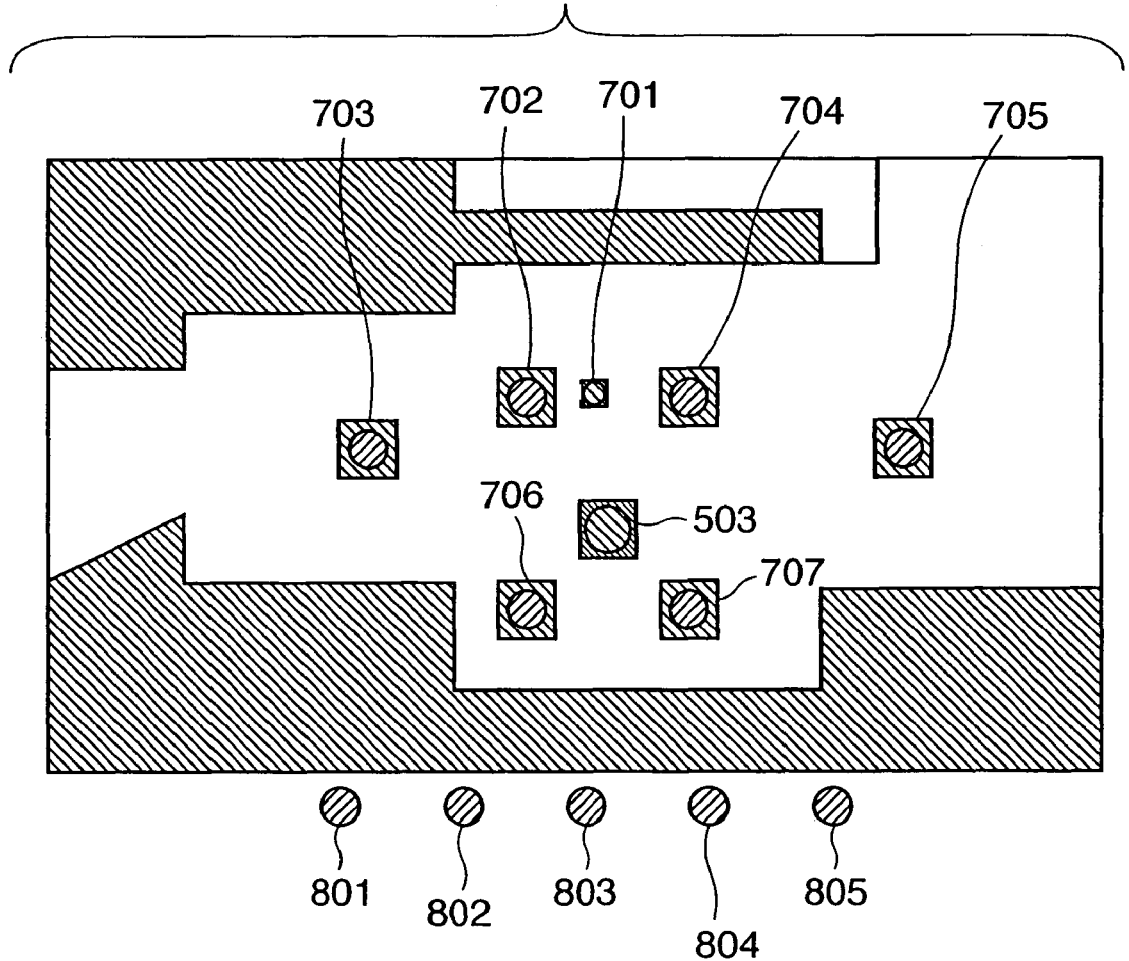
FIG. 8 shows mode switch buttons.

Manipulations of the virtual object include object rotation, right-and-left movement, back-and-forth movement, up-and-down movement, and the like. In order to determine correspondence between the plurality of manipulations and two actions (back-and-forth and right-and-left rolling actions) using the trackball, a manipulation mode must be switched. As a mode switching UI, for example, a keyboard or mode switch buttons 801 to 805 shown in FIG. 8 may be used. FIG. 8 shows the mode switch buttons. These buttons may be provided to a region of the map image presentation device 202 where the map image is not displayed by the projector, or may be provided to an independent device.

For example, when the user rolls a trackball 701 while holding down the button 801, the selected virtual object rotates in the rolling direction. Likewise, when the user rolls the trackball 701 (rolls it in the back-and-forth direction) while holding down the button 802, the selected virtual object moves in the rolling direction. Likewise, when the user rolls the trackball 701 (rolls it in the back-and-forth direction) while holding down the button 803, the selected virtual object moves in the rolling direction. Likewise, when the user rolls the trackball 701 (rolls it in the right-and-left direction) while holding down the button 804, the selected virtual object moves in the rolling direction. When the user presses the button 805 that provides an annotation function, a comment associated with the selected virtual object is displayed on the map image presentation device 202, and an audio message associated with the selected virtual object, which is recorded in advance and held in a virtual object manipulation input module 107, is also played back.

The functions to be implemented by the buttons are not limited to these specific functions, and other functions may be added. Also, manipulation methods as a combination of the buttons and trackball are not limited to those.

The virtual object manipulation input module 107 manages various kinds of information used upon manipulating a virtual object using the virtual object manipulation input UI 206 and virtual object manipulation mode switch UI, and passes a virtual object manipulation result to the simulation module 105.

In this embodiment, the trackball is used as the viewpoint position•visual axis direction input UI 503 and virtual object manipulation input UI 701. However, the present invention is not limited to such specific device, and a joystick, track pad, and the like may be used as long as they are different position-fixed input devices.

Also, the user can make various manipulations of the map image. In such case, the user uses a map display manipulation input module 109 which comprises a keyboard, mouse, buttons, and the like. As manipulation operations, enlargement/reduction of the map image, setups of the description level of the map image (setups of fineness or the number of polygons of geometric information used in image generation, a setup as to whether or not a texture image is pasted onto the map image, a setup as to whether or not the map image is displayed as a wire frame, etc.), a height setup for setting the height on the 3D virtual space from which the map image is generated, a setup as to whether or not a broad-range map image and narrow-range map image are to be simultaneously displayed, and the like are available. Various kinds of setup information input using the map display manipulation input module 109 are sent to the simulation module 105. Some map display manipulations will be described in detail below.

Figure 9A:
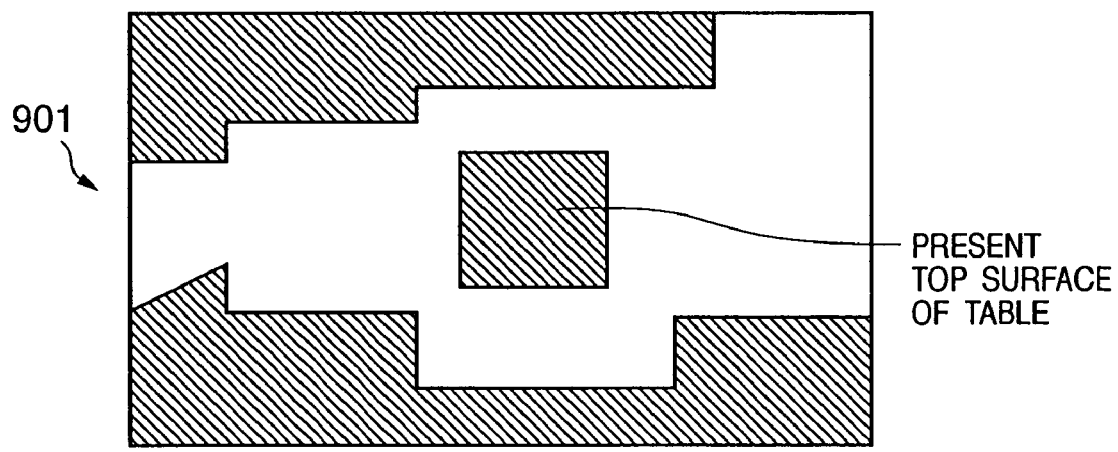
FIG. 9A shows an example of a map image obtained as a result of setting different heights.
Figure 9B:
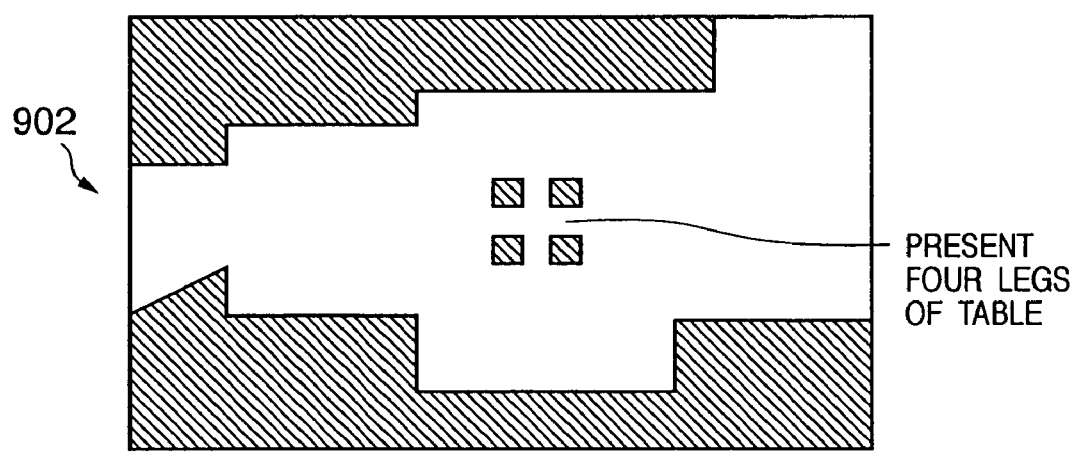
FIG. 9B shows an example of a map image obtained as a result of setting different heights.

FIGS. 9A and 9B show map images of the 3D space, which are obtained as results of setting different heights. A map image 901 shown in FIG. 9A is generated on the basis of a height at which the top surface of a table located at the center of the map can be observed. On the other hand, a map image 902 shown in FIG. 9B is generated on the basis of a height lower than that used upon generating the map image 901. Hence, in the map image 902, the top surface of the table cannot be displayed, and only four legs of the table are displayed.

Figure 10:
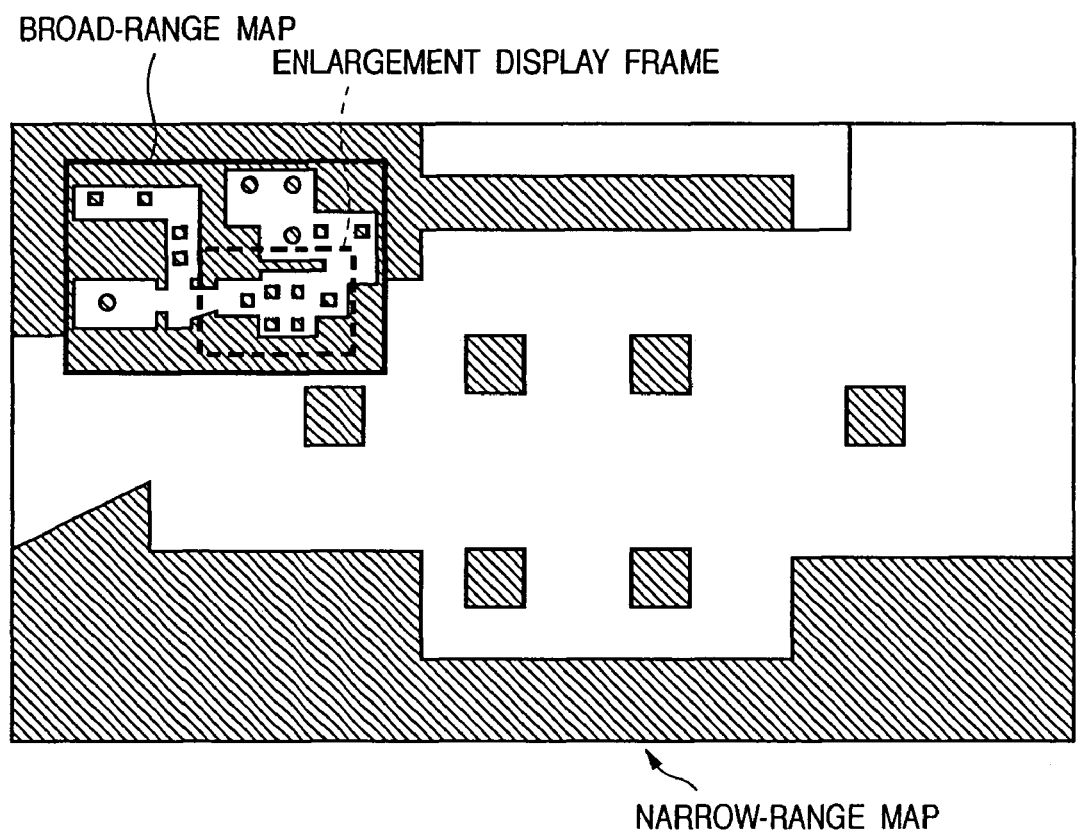
FIG. 10 shows a simultaneous display example of a broad-range map image and narrow-range map image.

FIG. 10 shows a simultaneous display example of a broad-range map image and narrow-range map image. In FIG. 10, a frame of a display region of the broad-range map image is displayed. The user can designate this frame using the map display manipulation input module 109, and can change the position of the display region or enlarge or reduce the display region. In this embodiment, the map image adopts a plan-view map image that looks down the 3D virtual space from a position immediately above the viewpoint position. However, the present invention is not limited to such specific image. For example, a map image as a bird's-eye view of the virtual space may be used.

A miscellaneous manipulation input module 108 in FIG. 1 is used to make inputs associated with miscellaneous manipulations, and sends such input information to the simulation module 105. As an example of miscellaneous manipulations, an adjustment function of the field angle of a view image, a function of resetting 3D virtual space data to an initial state, a function of switching virtual space contents, and the like are available.

In this embodiment, a view image and map image are rendered by the single apparatus. However, these processes impose a heavy load on the apparatus. Hence, these processes may be executed by an external computer (may be executed by different computers), and the processing results alone may be sent from the computer.

Figure 11:
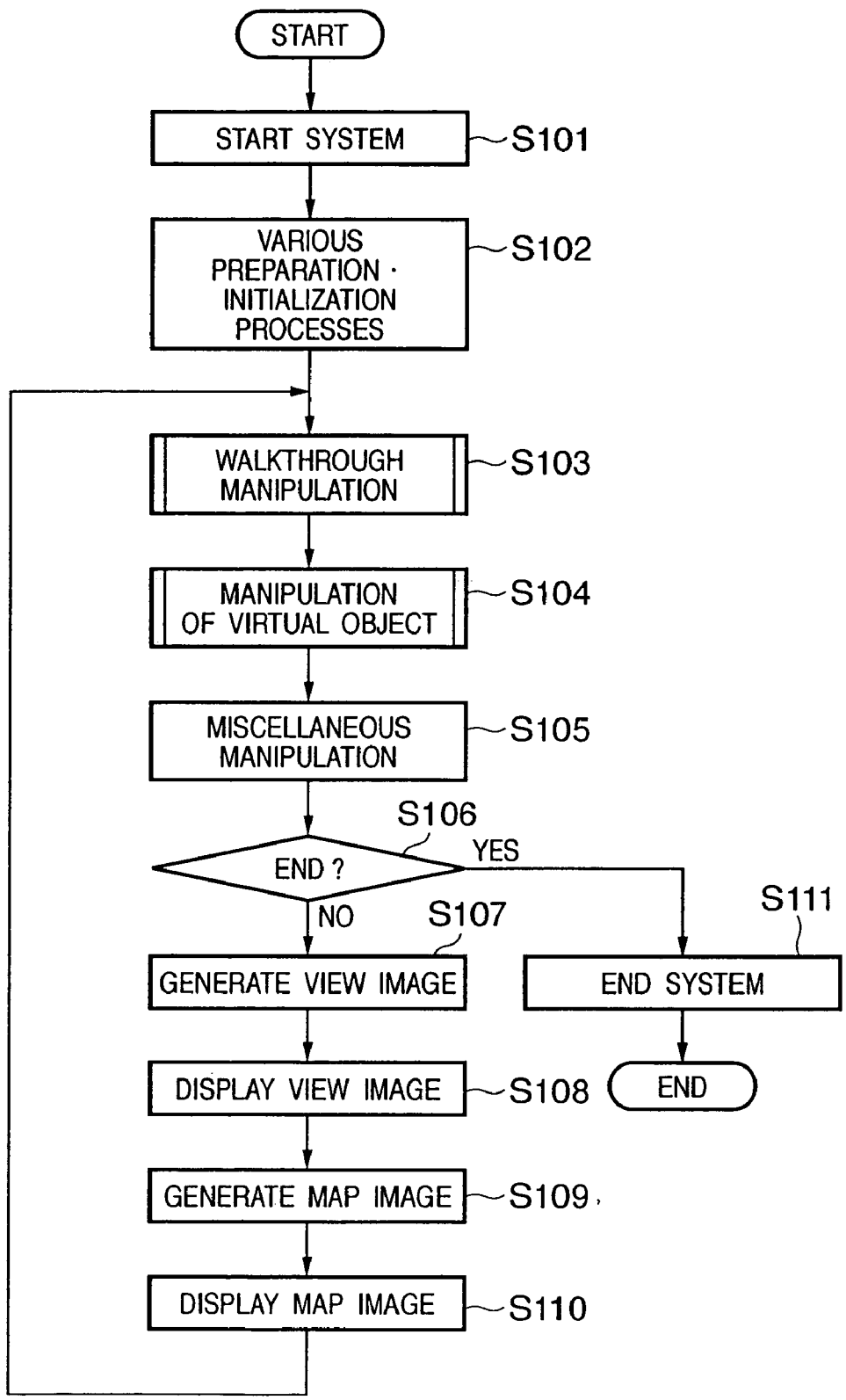
FIG. 11 is a flow chart of various processes which are executed by the virtual space rendering/display apparatus according to the first embodiment of the present invention so as to allow the user to experience a 3D virtual space.

FIG. 11 is a flow chart of various processes which are executed by the virtual space rendering/display apparatus according to this embodiment so as to allow the user to experience the 3D virtual space. The processes will be described below using this flow chart.

The virtual space rendering/display apparatus is started up, and is initialized (step S101). In order to execute various processes that allow the user to experience the 3D virtual space, 3D virtual space data and the like are loaded, and various initialization processes are executed (step S102).

After that, processes that allow the user to experience the 3D virtual space are executed. A viewpoint position•visual axis direction information input module 106 calculates the viewpoint position and visual axis direction in accordance with input information from the respective UIs, and sends the calculated information to the simulation module 105 (step S103). Note that other processes associated with walkthrough are executed in step S103. Details of the process in step S103 will be described later.

On the other hand, the virtual object manipulation input module 107 sends input information associated with a manipulation of a virtual object to the simulation module 105 (step S104). Details of the process in step S104 will be described later. The miscellaneous manipulation input information input from the miscellaneous manipulation input module 108 is sent to the simulation module 105 (step S105).

If a processing end instruction is input, the flow advances to step S111 to execute an end process of the virtual space rendering/display apparatus (step S111). On the other hand, if no end instruction is input, the flow advances to step S107. The view image rendering module 102 generates an image (view image) of the virtual space corresponding to the viewpoint position and visual axis direction using the viewpoint position, visual axis direction information, field angle, and 3D virtual space data sent from the simulation module 105 (step S107). The generated view image is presented by the view image presentation module 101 (step S108).

The map image rendering module 104 generates a map image using the viewpoint position and visual axis direction information sent from the simulation module 105 and various kinds of information which are input from the map display manipulation input module 109 and are required to display a map image (step S109). The generated map image is presented by the map image presentation module 103 (step S110).

If the virtual space rendering/display apparatus can execute parallel processes, the processes in steps S107 and S109 may be parallelly executed. If these processes are executed by an external apparatus, the processes in steps S107 and S109 are replaced by those for receiving processing results from the external apparatus.

Figure 12:
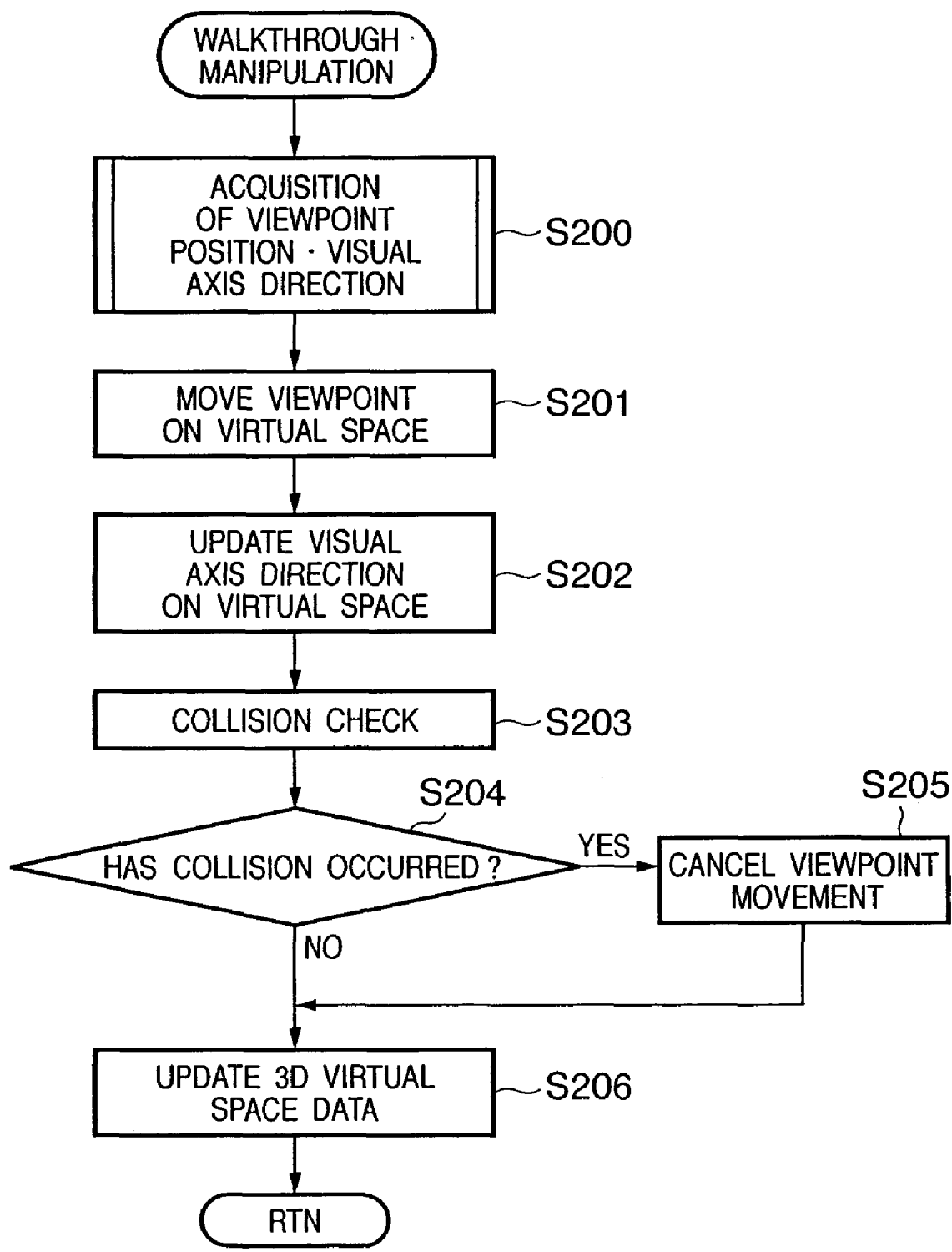
FIG. 12 is a flow chart showing details of the process in step S103.

Details of the process associated with walkthrough in step S103 will be described below using the flow chart shown in FIG. 12. FIG. 12 is a flow chart showing details of the process in step S103.

The viewpoint position•visual axis direction input module 106 calculates a new viewpoint position and visual axis direction on the virtual space using the viewpoint position and visual axis direction information input from the viewpoint position•visual axis direction input UI 503 (step S200). Details of the process in step S200 will be described later. The simulation module 105 moves the viewpoint position on the virtual space to the calculated new viewpoint position (step S201), and updates the visual axis direction at that viewpoint to the calculated new visual axis direction (step S202).

The simulation module 105 executes a collision check process between the viewpoint (object) and an obstacle on the 3D virtual space upon moving the viewpoint on the virtual space as a result of the above processes (step S203), and checks if collision has occurred (step S204).

If collision has occurred, the flow advances to step S205. The simulation module 105 returns the viewpoint position to that before movement in step S201 (step S205). Note that the viewpoint position need not always be returned to the previous position in step S205 but may be moved to a position where the viewpoint does not collide against an obstacle.

After the process in step S205 or if no collision has occurred, the current viewpoint position information and visual axis direction information are held as the 3D virtual space data in the 3D virtual space data memory 110 (step S206).

Figure 13:
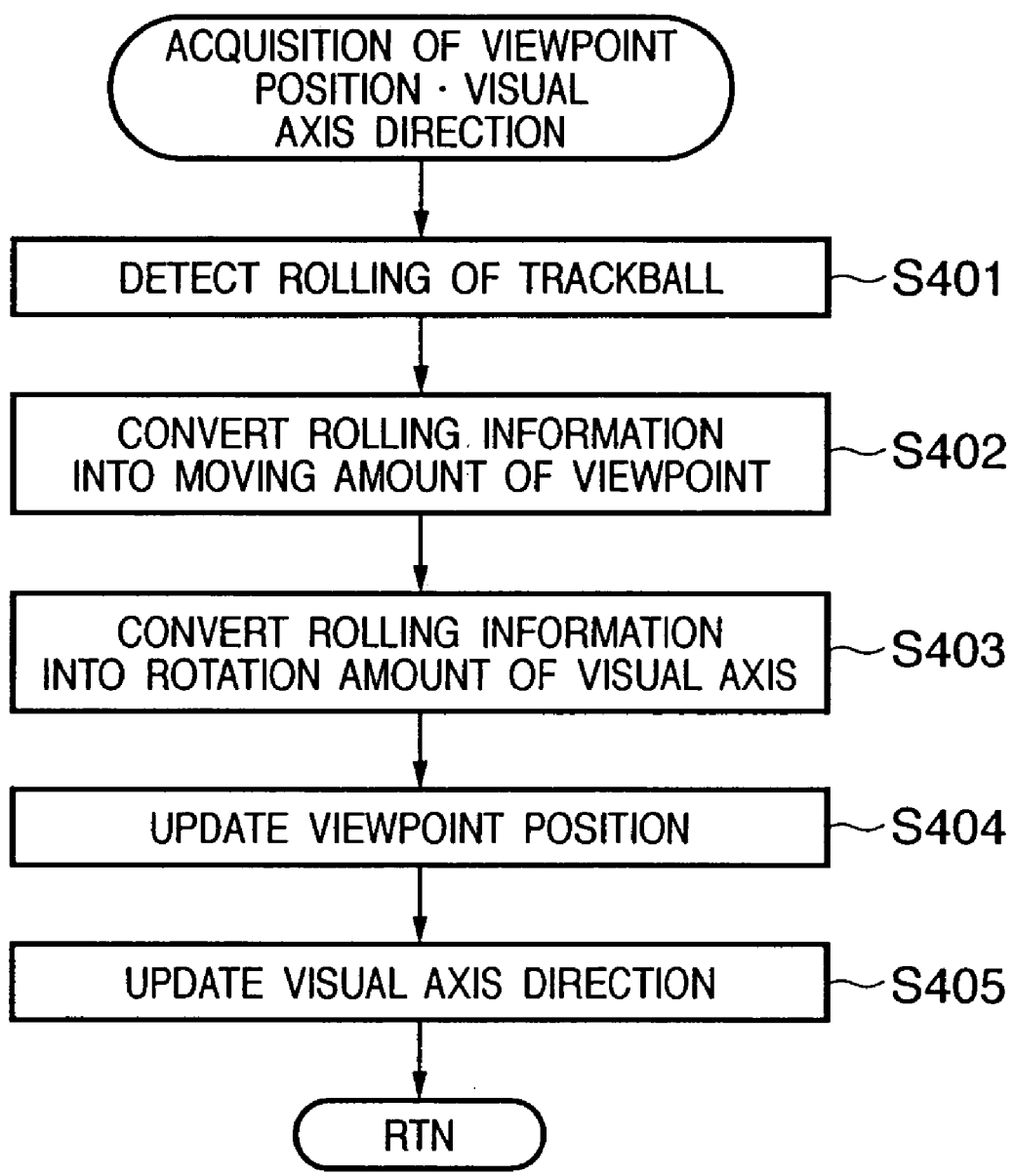
FIG. 13 is a flow chart showing details of the process in step S200.

Details of the process in step S200 will be described below using the flow chart shown in FIG. 13. FIG. 13 is a flow chart showing details of the process in step S200.

The viewpoint position•visual axis direction input module 106 detects inputs from the viewpoint position•visual axis direction input UI (step S401). In this embodiment, since the trackball is used as the viewpoint position•visual axis direction input UI, rolling information (rolling direction and amount) of the trackball is detected.

Based on the detected rolling direction and amount, the moving amount of the viewpoint (step S402) and the change amount (rolling amount) of the visual axis direction (step S403) are calculated. The viewpoint position (step S404) and visual axis direction (step S405) are updated to calculated new ones.

Figure 14:
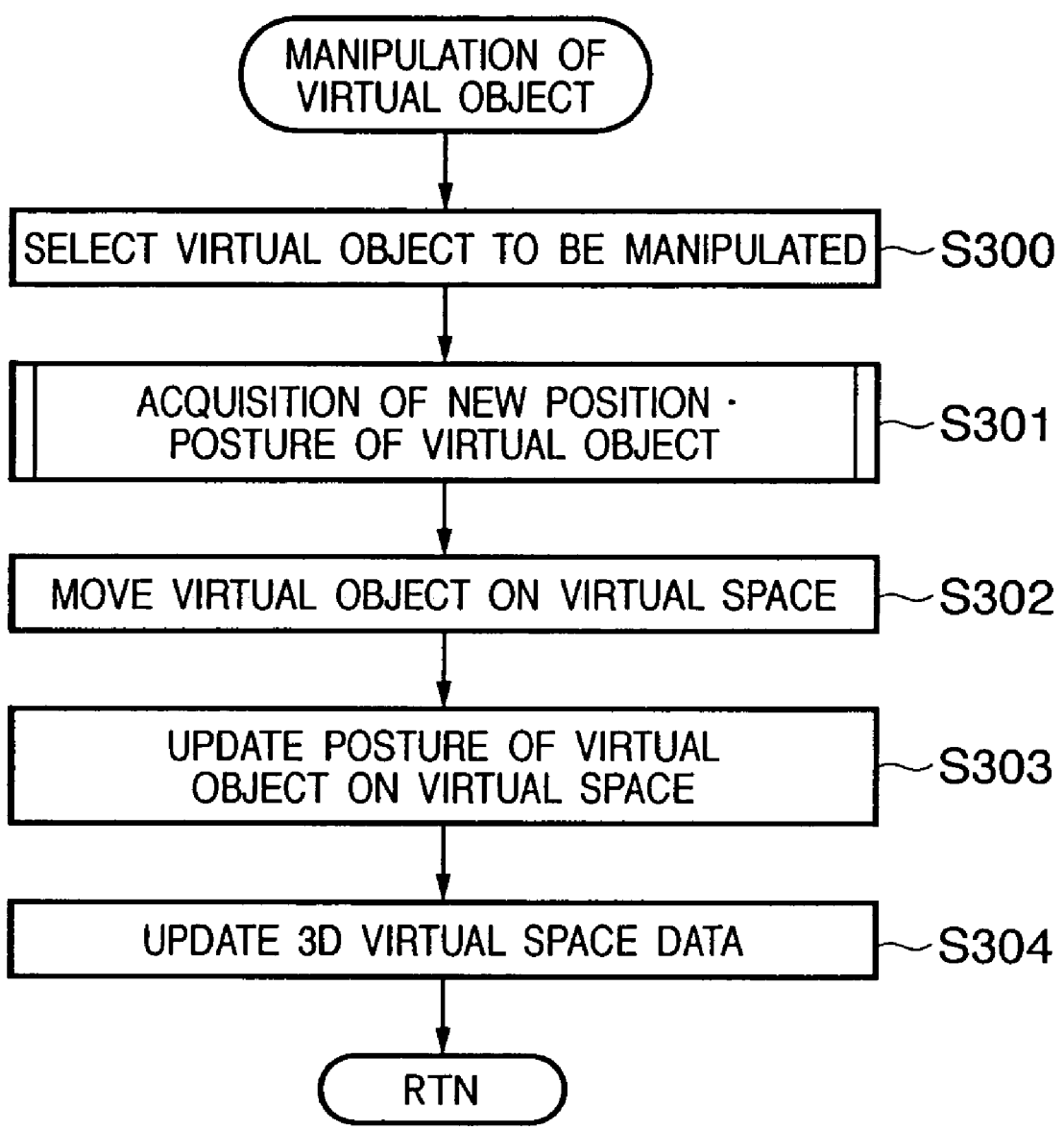
FIG. 14 is a flow chart showing details of the process in step S104.

Details of the process in step S104 will be described below using the flow chart shown in FIG. 14. FIG. 14 is a flow chart showing details of the process in step S104.

The control waits for selection of a virtual object to be manipulated, which is input using the virtual object manipulation input UI or is located at a position closest to that of the virtual object manipulation input UI (step S300). The simulation module 105 calculates a new position and posture of the virtual object to be manipulated on the basis of the manipulation contents for the selected virtual object, i.e., the position and posture information of the virtual object input from the virtual object manipulation input UI (step S301), and updates the position (step S302) and posture (step S303) of the virtual object. Details of the process in step S301 will be described later. Then, the updated position and posture data are held in the 3D virtual space data memory 110 as 3D virtual space data, i.e., the position and posture data of the selected virtual object (step S304).

Figure 15:
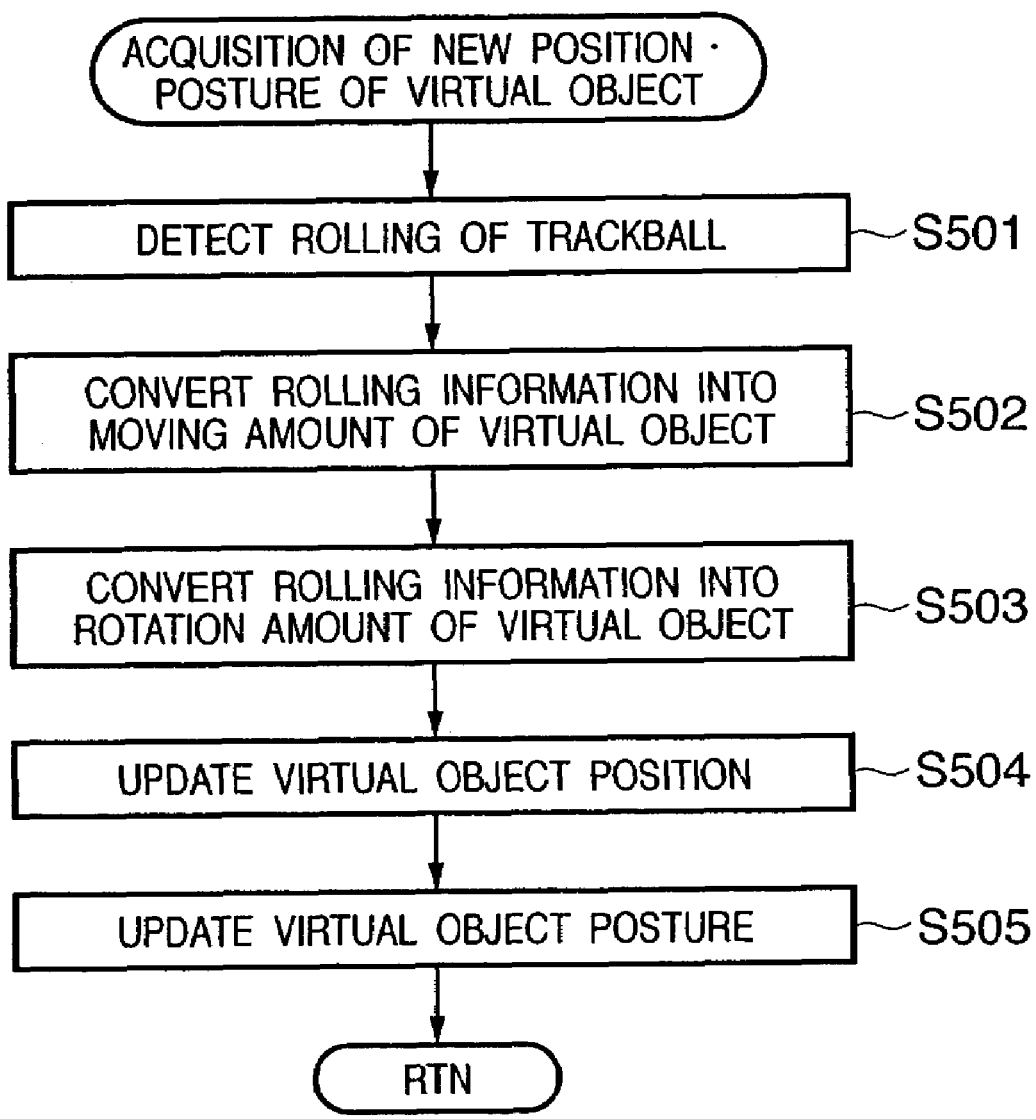
FIG. 15 is a flow chart showing details of the process in step S301.

Details of the process in step S301 will be described below using the flow chart shown in FIG. 15. FIG. 15 is a flow chart showing details of the process in step S301.

The virtual object manipulation input module 107 detects inputs from the virtual object manipulation input UI (step S501). In this embodiment, since the trackball is used as the virtual object manipulation input UI, rolling information (rolling direction and amount) of the trackball is detected.

Based on the detected rolling direction and amount, the moving amount of the virtual object (step S502) and the change amount (rolling amount) of the posture (step S503) are calculated. Then, the position (step S504) and posture (step S505) of the virtual object are updated to the calculated new ones.

Figure 16:
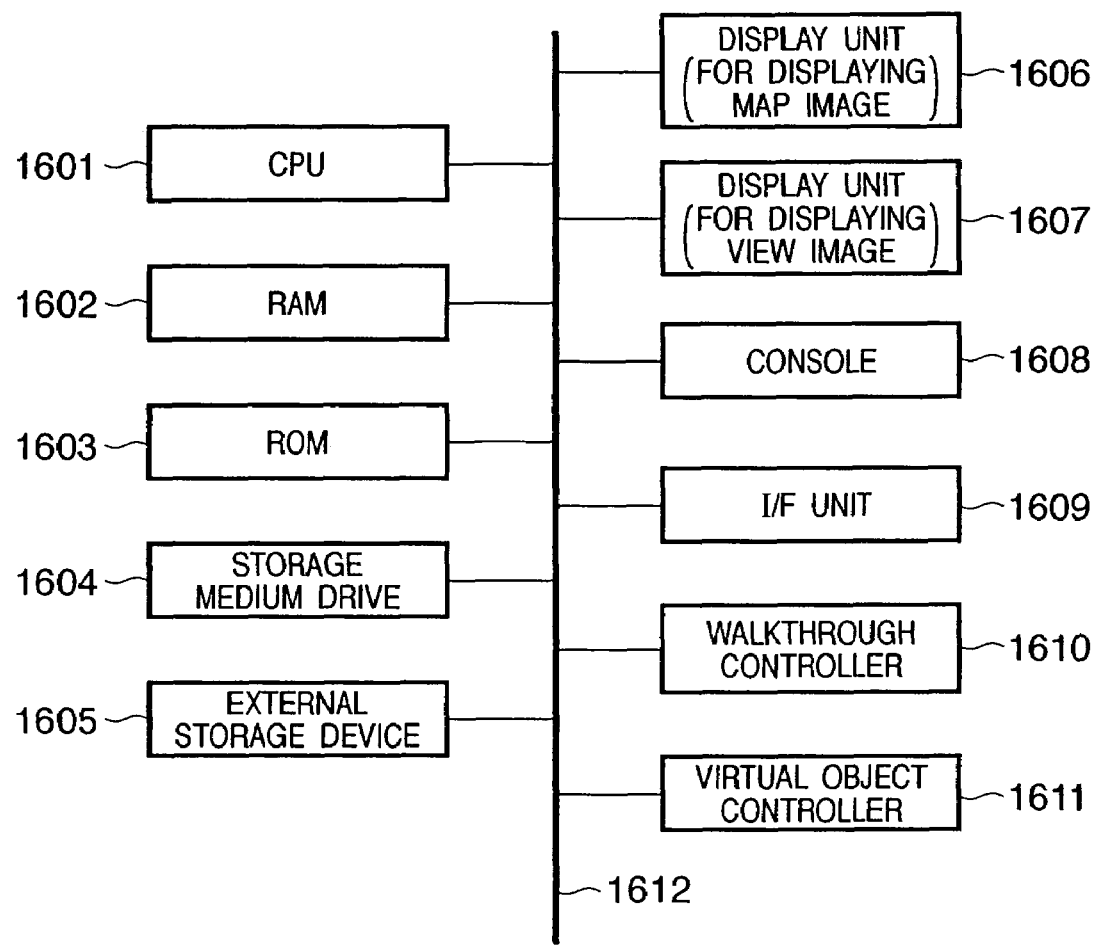
FIG. 16 is a block diagram showing the basic arrangement of the virtual space rendering/display apparatus according to the first embodiment of the present invention.

FIG. 16 is a block diagram showing the basic arrangement of the virtual space rendering/display apparatus according to this embodiment. Reference numeral 1601 denotes a CPU which loads and executes programs, data, and the like stored in a RAM 1602 or ROM 1603, and executes control of the overall computer, the aforementioned processes, and the like.

Reference numeral 1602 denotes a RAM, which has an area for temporarily storing programs, data, and the like, loaded from a storage medium driver 1604 and external storage device 1605, and also a work area and the like used when the CPU 1601 executes various processes. Reference numeral 1603 denotes a ROM, which stores programs (including a boot program) used to control the overall computer and data (including various setups and the like). Also, the ROM 1603 stores character codes and the like.

Reference numeral 1604 denotes a storage medium drive, which loads programs, data, and the like from a storage medium such as a CD-ROM, DVD-ROM, and the like. Reference numeral 1605 denotes an external storage device, which saves programs, data, and the like loaded from the storage medium drive 1604. When the work area size used by the CPU 1601 has exceeded that assured on the RAM 1602, the external storage device 1605 can provide a work area corresponding to the difference as a file.

Reference numerals 1606 and 1607 denote display units, which are respectively used to display a map image and view image, and serve as the map image presentation module 103 and view image presentation module 101. The display units comprise a CRT, liquid crystal display, projector, or the like, and can display a view image and map image, and other GUIs and the like required upon execution. Reference numeral 1608 denotes a console, which includes a keyboard and a pointing device such as a mouse or the like, and can input various instructions to the computer. The console 1608 can be used as the mode switch UI.

Reference numeral 1609 denotes an interface (I/F) unit, which includes a network interface used to establish connection to the Internet or the like, and an interface used to connect a peripheral device such as a printer or the like. The I/F unit 1609 can be used when an external apparatus executes a rendering process, and the processing result is to be received from the external apparatus. Also, the view image and map image generated by the virtual space rendering/display apparatus can be transmitted to the external apparatus via the I/F unit 1609.

Reference numeral 1610 denotes a walkthrough controller, which is provided on the display unit 1606, and serve as the viewpoint position•visual axis direction input UI, viewpoint position•visual axis direction input module 106, miscellaneous manipulation input module 108, and map display manipulation input module 109. Reference numeral 1611 denotes a virtual object controller, which is provided on the display unit 1606, and serves as the virtual object manipulation input UI and virtual object manipulation input module 107. Reference numeral 1612 denotes a bus which interconnects the aforementioned units.

As described above, according to the first embodiment, the user can easily and intuitively walk through the 3D virtual space and manipulate a virtual object on the virtual space.

Second Embodiment

In the virtual space rendering/display apparatus according to the first embodiment, the viewpoint position•visual axis direction input UI is fixed in position with respect to the map image display screen, and the map image scrolls or rotates upon walkthrough. Also, the virtual object manipulation input UI is fixed in position with respect to the map image display screen.

In a virtual space rendering/display apparatus according to this embodiment, the viewpoint position•visual axis direction input UI is movable on the map image display screen. Also, the virtual object manipulation input UI is movable on the map image display screen, while the map image is fixed in position. The user moves the virtual object manipulation input UI to a position near a virtual object and selects that virtual object. When the user manipulates the virtual object manipulation UI while the virtual object is selected, the virtual object is displayed to follow the UI.

The functional arrangement of the virtual space rendering/display apparatus according to this embodiment comprises position/posture sensors in addition to that shown in FIG. 1. The viewpoint position•visual axis direction information input module 106 and virtual object manipulation input module 107 according to this embodiment have the same functions as those in the first embodiment, but have different arrangements. In this embodiment, a method of determining a region on a virtual space used as a map image is different from the first embodiment.

Figure 17:
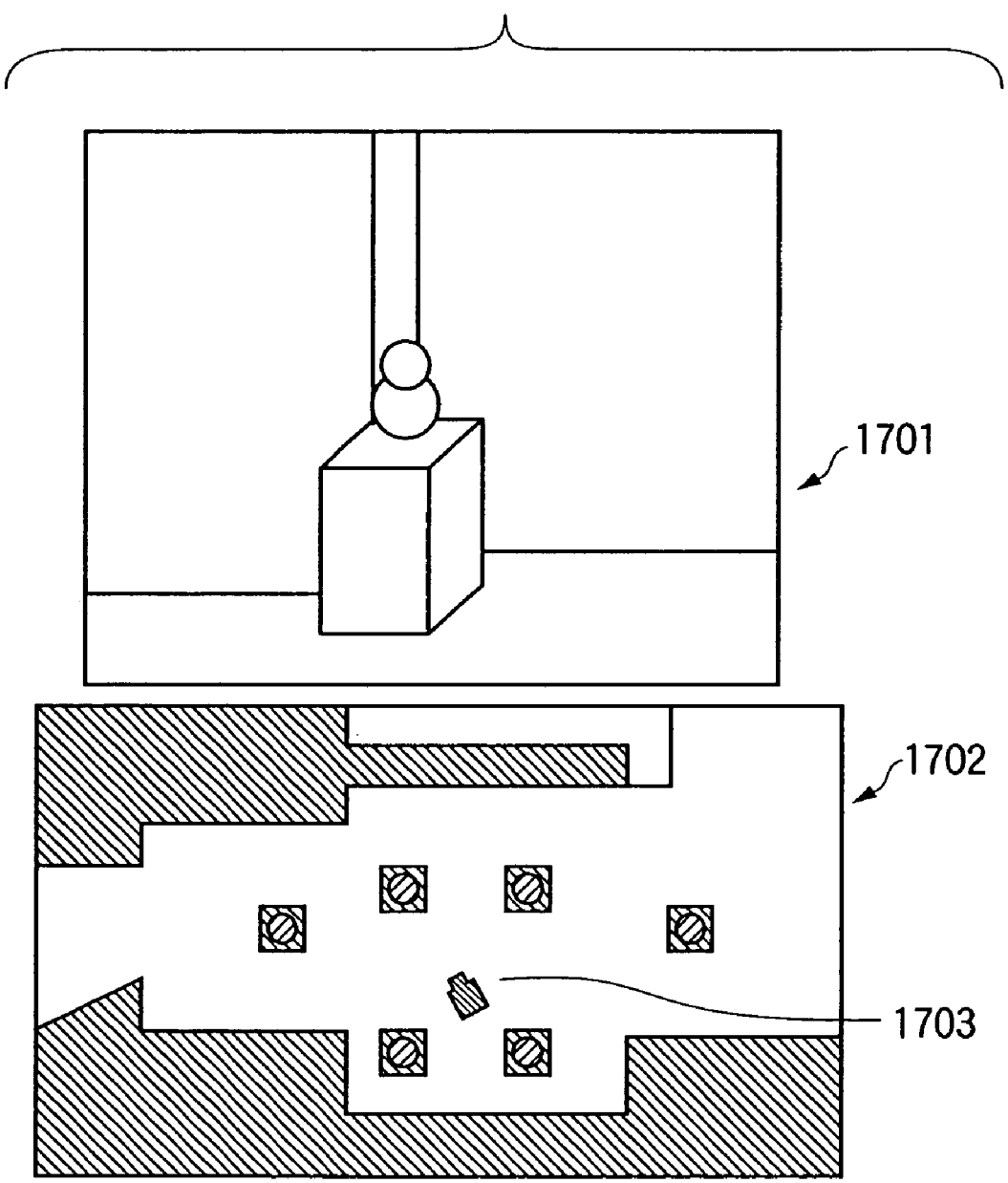
FIG. 17 shows a view image displayed on the view image presentation device 201, a map image displayed on the map image presentation device 202, and a viewpoint position•visual axis direction input UI 1703 provided on the map image.

The differences from the first embodiment will be described below. FIG. 17 shows a view image displayed on the view image presentation device 201, a map image displayed on the map image presentation device 202, and a viewpoint position•visual axis direction input UI 1703 provided on the map image. In FIG. 17, a virtual object manipulation input UI is not shown for the sake of simplicity.

In this embodiment, a sensor as a receiver which can detect the self position and posture on the basis of a magnetic field transmitted by a magnetic position/posture sensor (to be described later) is used as the viewpoint position•visual axis direction input UI 1703. More specifically, the viewpoint position•visual axis direction input UI 1703 sends a signal corresponding to the self position and posture to the simulation module 105, which calculates the position and posture of the viewpoint position•visual axis direction input UI 1703 on the map image presentation device on the basis of the received signal.

The viewpoint position•visual axis direction input UI 1703 according to this embodiment is movable on the display screen of the map image presentation device 202, and the user can hold and place the viewpoint position•visual axis direction input UI 1703 at an arbitrary position and posture on the display screen. Using such viewpoint position•visual axis direction input UI, the user can manipulate the viewpoint position and visual axis direction more intuitively.

Figure 18:
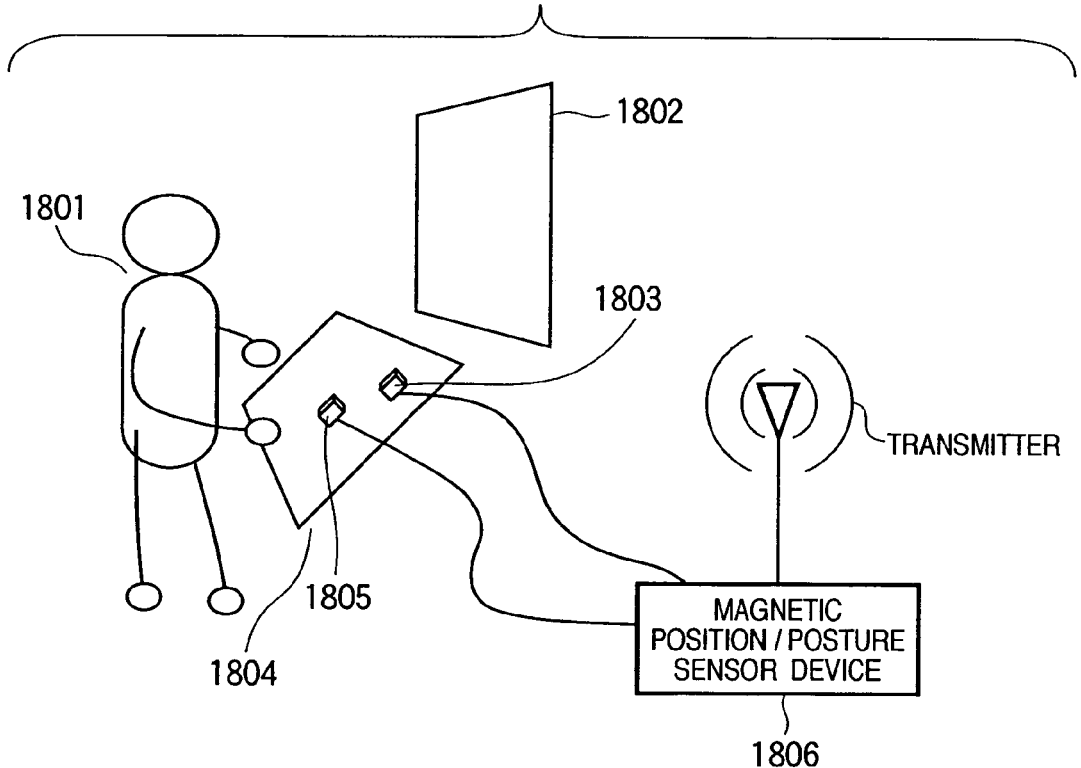
FIG. 18 shows a state wherein the user operates a virtual space rendering/display apparatus according to the second embodiment of the present invention.

FIG. 18 depicts a state wherein the user operates the virtual space rendering/display apparatus of this embodiment. As described above, the virtual space rendering/display apparatus according to this embodiment comprises a transmitter 1806A of the magnetic position/posture sensor, and the viewpoint position•visual axis direction input UI which serves as the receiver of the magnetic position/posture sensor can detect the self position and posture on the basis of a magnetic field transmitted from this transmitter. Since the position/posture measurement method using a magnetic sensor is a state-of-the-art technique, a description thereof will be omitted. On the other hand, calibration must be done in advance so that a given position is detected to have a predetermined position on the map image presentation device as an origin. Also, calibration must be done in advance so that a given posture is detected with reference to a predetermined posture.

In this embodiment, the virtual object manipulation input UI has the same arrangement as that of the viewpoint position•visual axis direction input UI, and serves as a receiver of the magnetic position/posture sensor. Note that this embodiment uses a magnetic sensor. However, the present invention is not limited to such specific sensor. For example, an optical sensor may be used.

Figure 19:
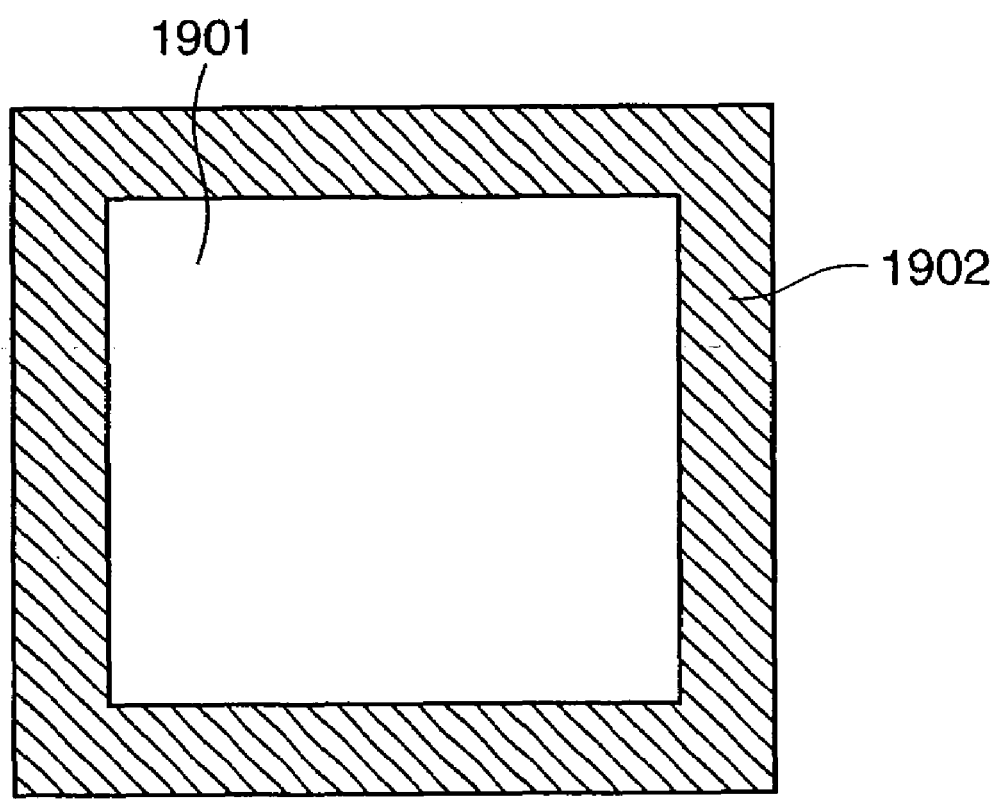
FIG. 19 shows a layout of the display screen of a map image presentation device 202.

When the user wants to place the viewpoint position•visual axis direction input UI at a position that falls outside the region of the displayed map image, he or she may rotate or scroll the map image using the miscellaneous manipulation input module 108 or the like. FIG. 19 shows an example upon scrolling the map image displayed on the display screen of the map image presentation device 202.

Figure 20:
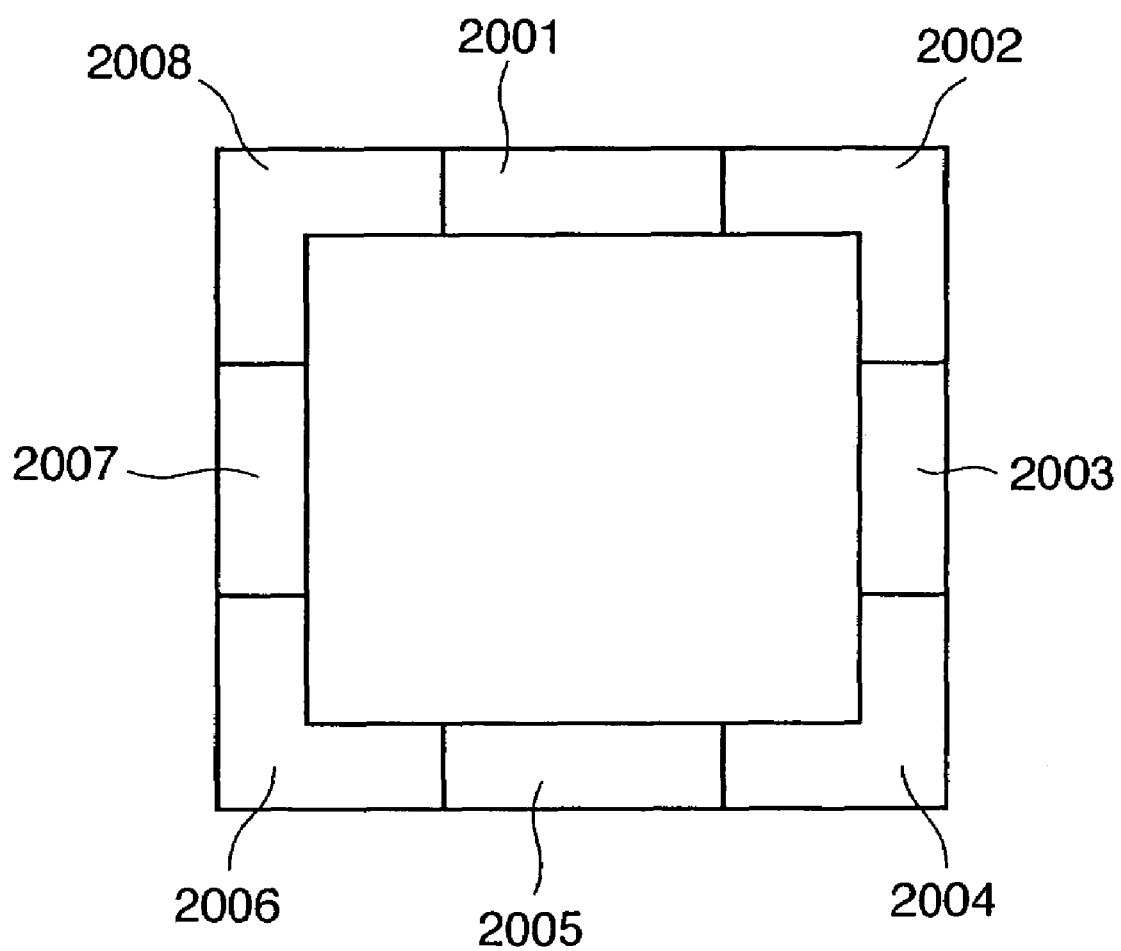
FIG. 20 shows details of a region 1902.

FIG. 19 shows a layout of the display screen of the map image presentation device 202. Referring to FIG. 19, a region 1901 displays a map image, and a region 1902 is used to scroll the map image displayed on the region 1901. FIG. 20 shows details of the region 1902.

As shown in FIG. 20, the region 1902 is made up of sub-regions 2001 to 2008. When the user places the viewpoint position•visual axis direction input UI on each of these sub-regions, he or she can scroll the map image displayed on the region 1901 in a direction corresponding to that sub-region. For example, when the user places the viewpoint position•visual axis direction input UI on the sub-region 2002, the map image displayed on the region 1901 scrolls in the upper right direction. When the user places the viewpoint position•visual axis direction input UI on the sub-region 2007, the map image displayed on the region 1901 scrolls in the left direction. In FIG. 20, eight scroll directions are defined. However, the present invention is not limited to these directions, and four or 16 directions may be used. Also, the sub-regions 2001 to 2008 used to scroll the map image in the respective directions may be expressed by arrows and the like.

Figure 21:
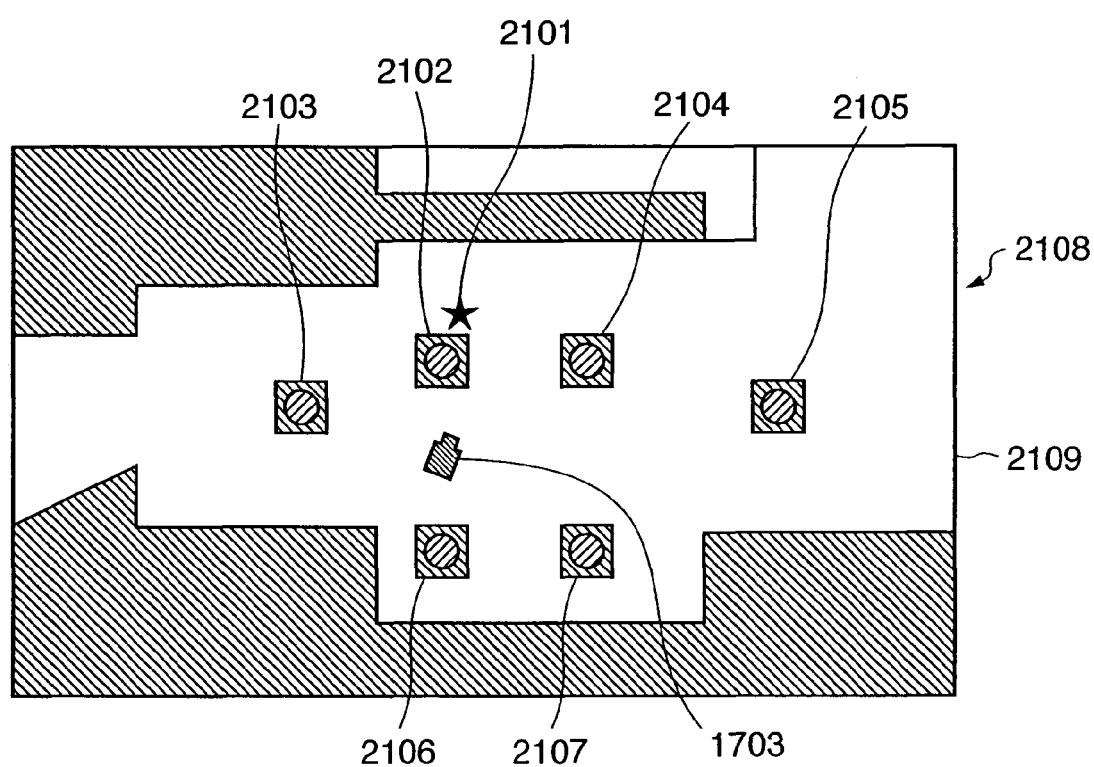
FIG. 21 shows a map image, and also shows the view point position•visual axis direction input UI and virtual object manipulation input UI provided on a map image presentation device which presents that map image.

The viewpoint position•visual axis direction control method using the virtual object manipulation input UI according to this embodiment will be described below. FIG. 21 shows a map image, and also shows the viewpoint position•visual axis direction input UI and virtual object manipulation input UI provided on the map image presentation device 202 that presents this map image.

In this embodiment, the virtual object manipulation input UI has two mode selection functions: a virtual object selection function and virtual object manipulation mode. These modes may be switched by providing a button used to switch the modes to the virtual object manipulation input UI, and alternatively selecting one of these modes every time the button is pressed.

The virtual object selection mode will be described below. In this embodiment, a virtual object which is located at a position closest to the virtual object manipulation input UI on the map image is selected as an object to be manipulated as in the first embodiment. Since the position of the virtual object manipulation input UI on the map image can be detected, the object to be selected can be determined by comparing the detected position and those of respective virtual objects on the map image. In FIG. 21, a virtual object 2102 is selected as an object to be manipulated.

After that, when the user wants to select another virtual object, he or she selects that virtual object using the virtual object manipulation input UI. In order to allow the user to visually identify the selected virtual object, the color of the image of the selected virtual object may be changed, the image may be flickered, or a frame may be displayed.

The virtual object manipulation mode will be described below. In the virtual object manipulation mode, the user can arbitrarily change the position and posture of the virtual object manipulation input UI by picking it up. When the user places the UI at an arbitrary position (on a region other than the sub-regions used to scroll) and arbitrary posture on the display screen of the map image presentation device, the selected virtual object takes the same position and posture as those determined by the user. This process can be implemented as follows. That is, the virtual object manipulation input UI sends a signal corresponding to the detected self position and posture to the simulation module 105, which calculates the position and posture of the virtual object manipulation input UI according to this signal, and updates the position and posture of the selected virtual object to those of the virtual object manipulation input UI.

Figure 22:
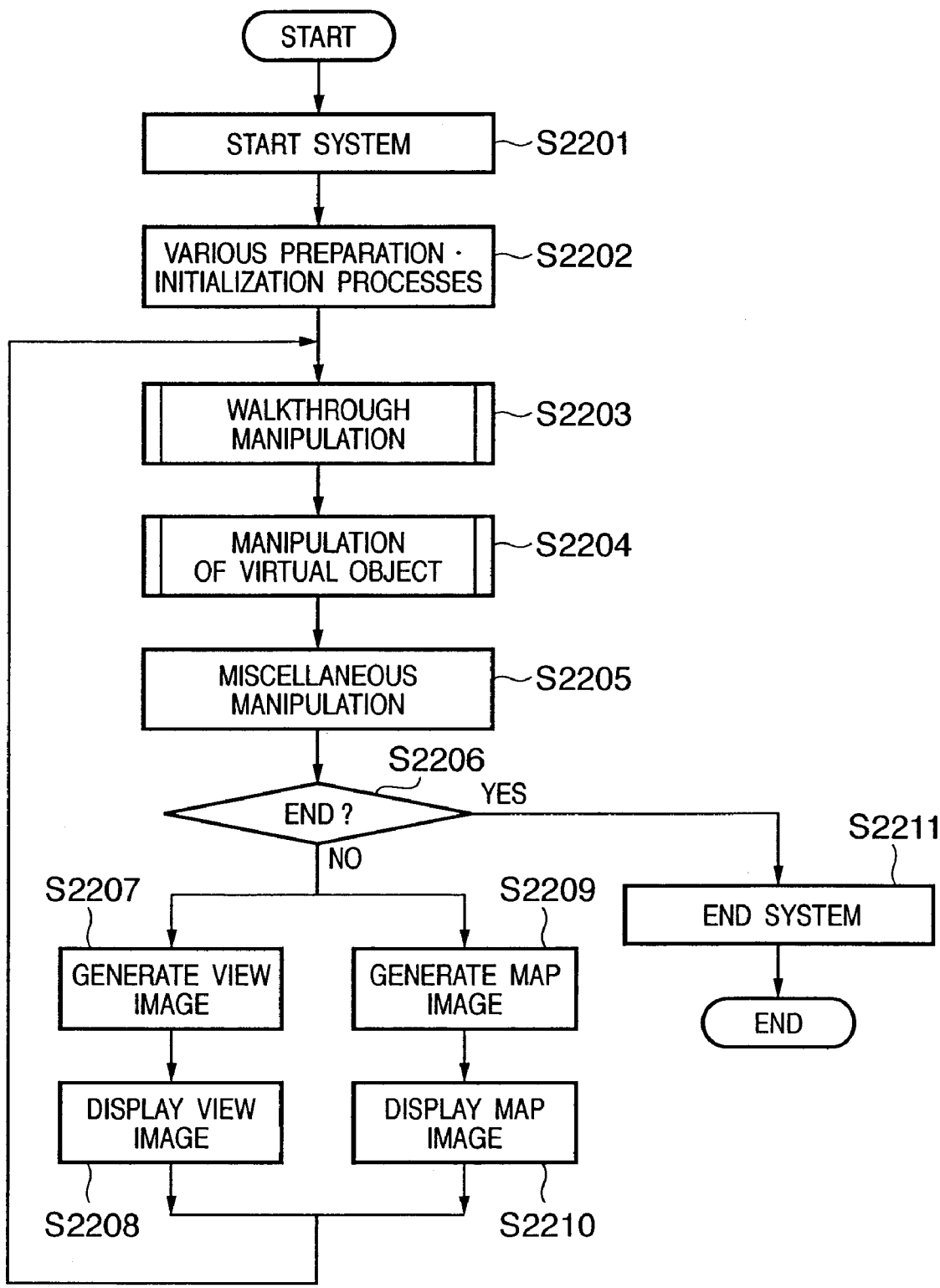
FIG. 22 is a flow chart of various processes which are executed by the virtual space rendering/display apparatus according to the second embodiment of the present invention so as to allow the user to experience a 3D virtual space.

FIG. 22 is a flow chart of various processes which are executed by the virtual space rendering/display apparatus according to this embodiment so as to allow the user to experience the 3D virtual space. The processes will be described below using this flow chart.

The virtual space rendering/display apparatus is started up as in step S101 (step S2201), and various processes are executed as in step S102 (step S2202).

After that, processes that allow the user to experience the 3D virtual space are executed. The viewpoint position•visual axis direction information input module 106 calculates the viewpoint position and visual axis direction in accordance with input information from the respective UIs, and sends the calculated information to the simulation module 105 (step S2203). Note that other processes associated with walk-through are executed in step S2203. Details of the process in step S2203 will be described later.

On the other hand, the virtual object manipulation input module 107 sends input information associated with a manipulation of a virtual object to the simulation module 105 (step S2204). Details of the process in step S2204 will be described later. The miscellaneous manipulation input information input from the miscellaneous manipulation input module 108 is sent to the simulation module 105 (step S2205).

If a processing end instruction is input, the flow advances to step S2211 to execute an end process of the virtual space rendering/display apparatus (step S2211). On the other hand, if no end instruction is input, the flow advances to steps S2207 and S2209. If the apparatus of this embodiment can execute parallel processes, processes in step S2207 and the subsequent step, and those in step S2209 and the subsequent step can be executed parallelly. However, if the apparatus of this embodiment cannot execute parallel processes, the processes in step S2207 and the subsequent step, and those in step S2209 and the subsequent step may be executed sequentially in an arbitrary order.

When an external apparatus executes the processes in step S2207 and the subsequent step, and those in step S2209 and the subsequent step, the processes in steps S2207 and S2209 are replaced by those for receiving processing results from the external apparatus.

The processes in step S2207 and the subsequent step will be described first. The view image rendering module 102 generates an image (view image) of the virtual space corresponding to the viewpoint position and visual axis direction using the viewpoint position, visual axis direction information, field angle, and 3D virtual space data sent from the simulation module 105 (step S2207). The generated view image is presented by the view image presentation module 101 (step S2208).

The processes in step S2209 and the subsequent step will be described below. The map image rendering module 104 generates a map image using the viewpoint position and visual axis direction information sent from the simulation module 105 and various kinds of information which are input from the map display manipulation input module 109 and are required to display a map image (step S2209). Also, when the user places the viewpoint position•visual axis direction input UI on a given sub-region to scroll the display region of the map image, a scroll process is also executed in step S2209. The generated map image is presented by the map image presentation module 103 (step S2210).

Figure 23:
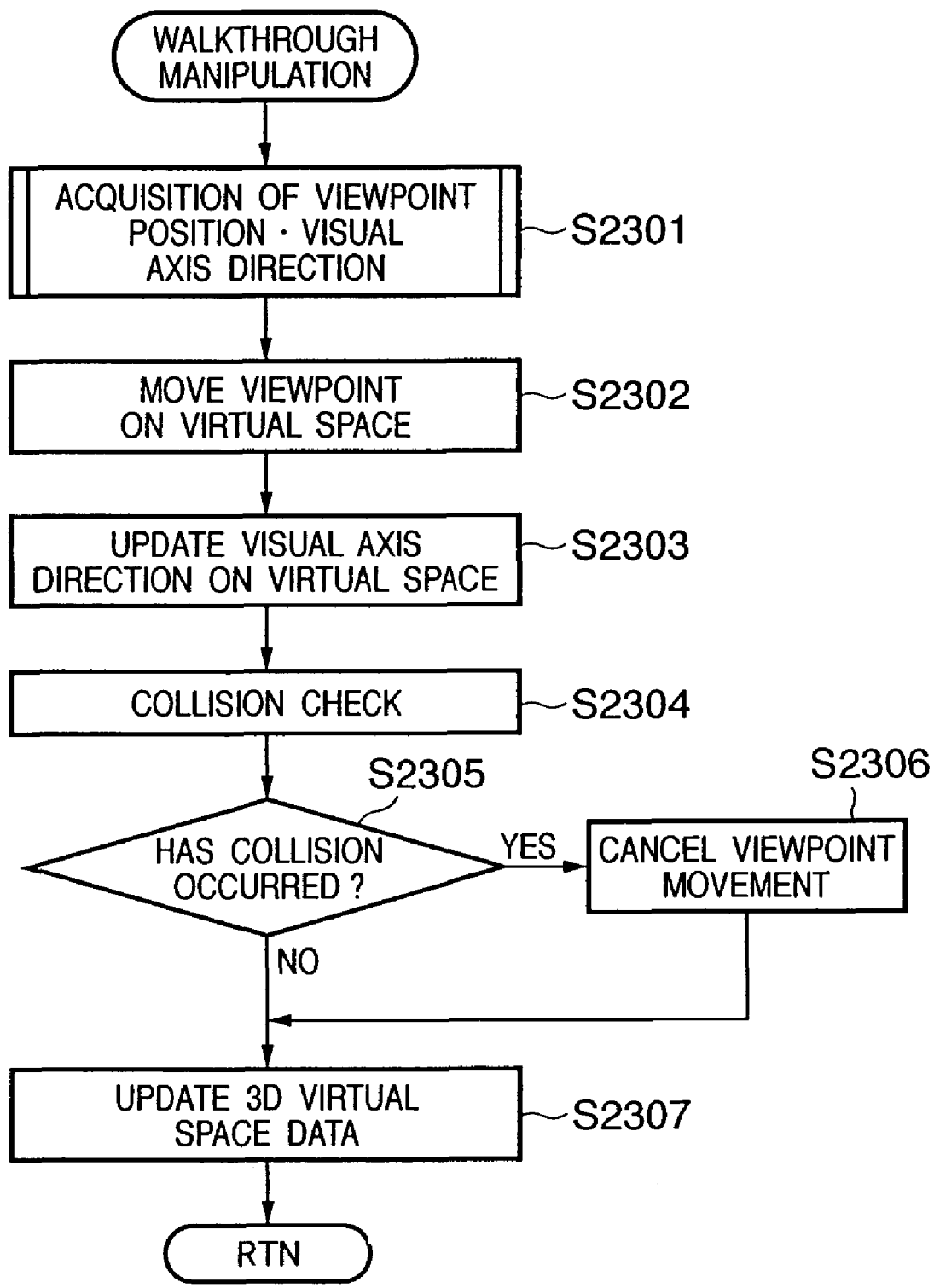
FIG. 23 is a flow chart showing details of the process in step S2203.

Details of the process associated with walkthrough in step S2203 will be described below using the flow chart shown in FIG. 23. FIG. 23 is a flow chart showing details of the process in step S2203.

The simulation module 105 receives a signal indicating the position and posture input from the viewpoint position•visual axis direction input UI 1703, and calculates a new position and posture (i.e., the viewpoint position and visual axis direction) of the viewpoint position•visual axis direction input UI 1703 on the virtual space (step S2301). Details of the process in step S2301 will be described later. The simulation module 105 moves the viewpoint position on the virtual space to the calculated new viewpoint position (step S2302), and updates the visual axis direction at that viewpoint to the calculated new visual axis direction (step S2303).

The simulation module 105 executes a collision check process between the viewpoint (object) and an obstacle on the 3D virtual space upon moving the viewpoint on the virtual space as a result of the above processes (step S2304), and checks if collision has occurred (step S2305).

If collision has occurred, the flow advances to step S2306. The simulation module 105 returns the viewpoint position to that before movement in step S2302 (step S2306). Note that the viewpoint position need not always be returned to the previous position in step S2306 but may be moved to a position where the viewpoint does not collide against an obstacle.

After the process in step S2306 or if no collision has occurred, the current viewpoint position information and visual axis direction information are held as the 3D virtual space data in the 3D virtual space data memory 110 (step S2307).

Figure 24:
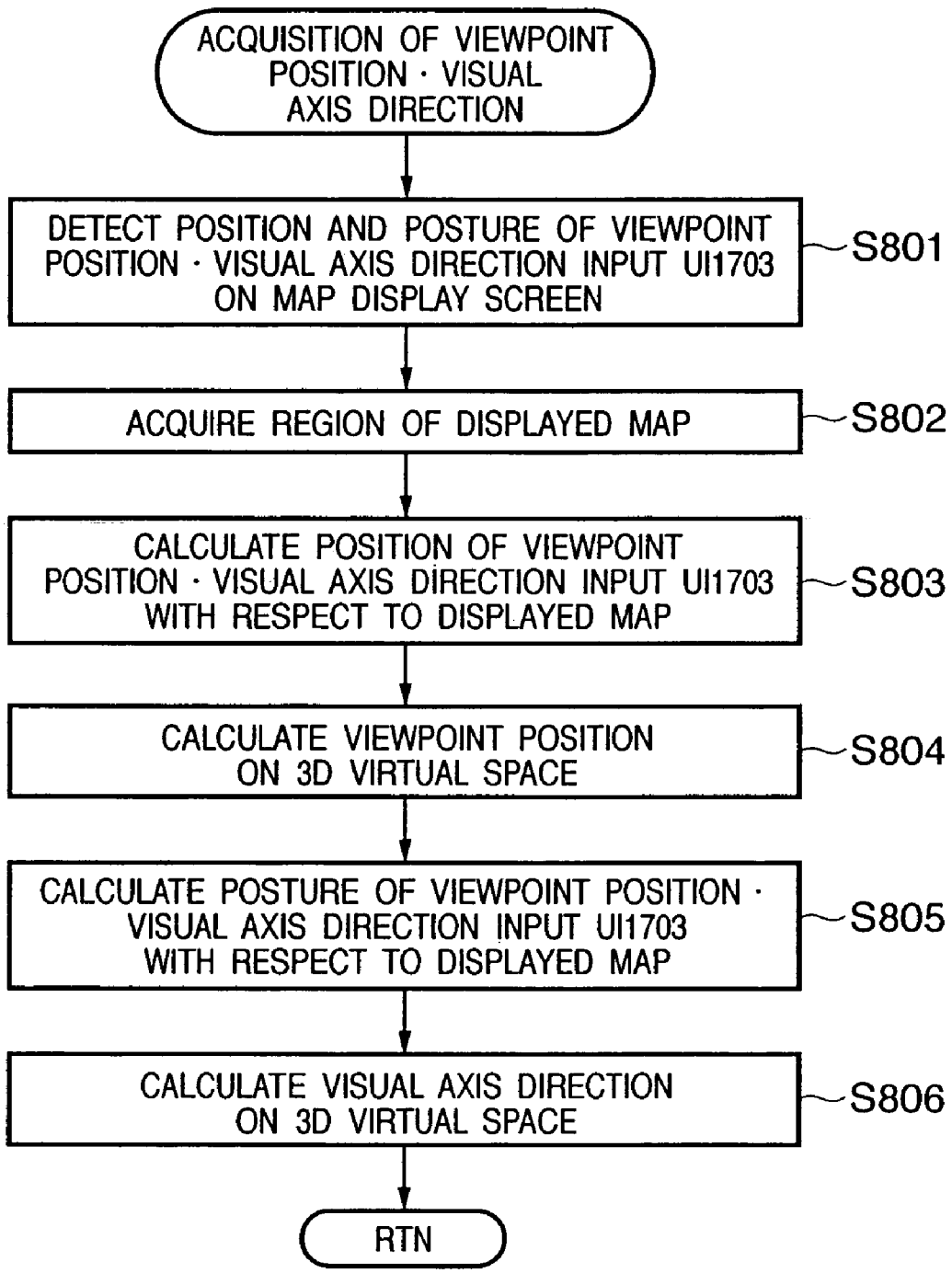
FIG. 24 is a flow chart showing details of the process in step S2301.

Details of the process in step S2301 will be described below using the flow chart shown in FIG. 24. FIG. 24 is a flow chart showing details of the process in step S2301.

The simulation module 105 detects the position and posture of the viewpoint position•visual axis direction input UI 1703 on the display screen of the map image presentation device (step S801). Also, the simulation module 105 acquires a region on the 3D virtual space, which is indicated by the map image displayed on the map image presentation device (step S802). The simulation module 105 then calculates the position of the viewpoint position•visual axis direction input UI on the acquired region (step S803). The simulation module 105 further calculates a position on the 3D virtual space, which corresponds to the position calculated in step S803 (step S804).

The simulation module 105 calculates the posture of the viewpoint position•visual axis direction input UI on the region acquired in step S802 (step S805). The simulation module 105 further calculates a posture on the 3D virtual space, which corresponds to the posture calculated in step S803 (step S806).

Details of the process in step S2204 will be described below using the flow chart shown in FIG. 25. FIG. 25 is a flow chart showing details of the process in step S2204.

The simulation module 105 calculates a position and posture on the 3D virtual space on the basis of the signal input from the virtual object manipulation input UI (step S2501). Details of the process in step S2501 will be described later. The currently selected mode is checked (step S2502). If the virtual object selection mode is currently selected, the flow advances to step S2503. A virtual object according to the selection condition is selected as an object to be manipulated (step S2503).

When the user moves a virtual object manipulation input UI 1803 on the map image in the virtual object selection mode, a virtual object to be selected may be turned to another one. If the map image presentation device adopts a front projection type projector, an image of the selected virtual object may be projected onto the virtual object manipulation input UI 1803.

On the other hand, if the virtual object manipulation (move, rotate) mode is currently selected, the flow advances to step S2504. The position of the virtual object selected in step S2503 is updated to that calculated in step S2501 (step S2504). Likewise, the posture of the virtual object selected in step S2503 is updated to that calculated in step S2501 (step S2505).

The updated position and posture data are held in the 3D virtual space data memory 110 as 3D virtual space data, i.e., the position and posture data of the selected virtual object (step S2506).

Details of the process in step S2501 will be described below using the flow chart shown in FIG. 26. FIG. 26 is a flow chart showing details of the process in step S2501.

The simulation module 105 detects the position and posture of the virtual object manipulation input UI 1803 on the display screen of the map image presentation device (step S901). Also, the simulation module 105 acquires a region on the 3D virtual space, which is indicated by the map image displayed on the map image presentation device (step S902). The simulation module 105 then calculates the position of the virtual object manipulation input UI 1803 on the acquired region (step S903). The simulation module 105 further calculates a position on the 3D virtual space, which corresponds to the position calculated in step S903 (step S904).

The simulation module 105 calculates the posture of the virtual object manipulation input UI 1803 on the region acquired in step S902 (step S905). The simulation module 105 further calculates a posture on the 3D virtual space, which corresponds to the posture calculated in step S903 (step S906).

As described above, according to this embodiment, the user can walk through the 3D virtual space as if he or she were moving a virtual camera on the map of the virtual space. Furthermore, the user can manipulate a virtual object on the 3D virtual space as if he or she were directly grabbing and manipulating a virtual object on the map image.

Another Embodiment

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the storage medium, that storage medium stores the program codes corresponding to the aforementioned flow charts (the flow charts shown in FIG. 11 and/or FIG. 12, and/or FIG. 13, and/or FIG. 14, and/or FIG. 15, and/or FIG. 22, and/or FIG. 23, and/or FIG. 24, and/or FIG. 25, and/or FIG. 26).

To restate, according to the present invention, the user can make walkthrough on a 3D virtual space and manipulation of a virtual object more easily.

As many apparently widely different embodiments of the present invention can be made without departing from the spirit and scope thereof, it is to be understood that the invention is not limited to the specific embodiments thereof except as defined in the claims.

What is claimed is:

1. A virtual space presentation apparatus comprising:
   a virtual space image generation unit adapted to generate an image of a virtual space, according to a viewpoint position and a visual axis direction which are set in the virtual space;
   a map image generation unit adapted to generate a map image representing a region around the viewpoint position, according to the viewpoint position and the visual axis direction;
   a view image displaying unit adapted to display the generated image of the virtual space;
   a map image displaying unit adapted to display the generated map image; and
   a viewpoint position and visual axis direction input unit, which is used to operate the viewpoint position and the visual axis direction, and which is fixed in a position on said map image displaying unit,
   wherein said map image generation unit generates an image of a plan-view map that looks down the region around the viewpoint position from a position immediately above the viewpoint.

2. The apparatus according to claim 1, wherein said map image generation unit generates the map image as a bird's-eye view.

3. A virtual space presentation apparatus comprising:
   a virtual space image generation unit adapted to generate an image of a virtual space, according to a viewpoint position and a visual axis direction which are set in the virtual space;
   a map image generation unit adapted to generate a map image representing a region around the viewpoint position, according to the viewpoint position and the visual axis direction;
   a view image displaying unit adapted to display the generated image of the virtual space;
   a map image displaying unit adapted to display the generated map image; and
   a viewpoint position and visual axis direction input unit, which is used to operate the viewpoint position and the visual axis direction, and which is fixed in a position on said map image displaying unit,
   wherein said viewpoint position and visual axis direction input unit is fixed in a position on a display screen of said map image displaying unit,
   the position of said viewpoint position and visual axis direction input unit on the display screen is a viewpoint position of a map image displayed on the display screen, and
   said map image displaying unit controls the viewpoint position and the visual axis direction, by scrolling a map image displayed on the display screen according to operation to said viewpoint position and visual axis direction input unit.

4. The apparatus according to claim 1, said viewpoint position and visual axis direction input unit includes a trackball, a joystick, and a track pad.

5. A virtual space display method comprising the steps of:
   generating an image of a virtual space, according to a viewpoint position and a visual axis direction which are set in the virtual space;
   generating a map image representing a region around the viewpoint position, according to the viewpoint position and the visual axis direction;
   displaying the generated image of the virtual space by a view image displaying unit;
   displaying the generated map image by a map image displaying unit; and
   setting the viewpoint position and the visual axis direction, according to an instruction input from a viewpoint position and visual axis direction input unit fixed in a position on said map image displaying unit,
   wherein said generating step includes generating an image of a plan-view map that looks down the region around the viewpoint position from a position immediately above the viewpoint.

6. A computer-readable storage medium storing a program for causing a computer to execute a virtual space display method of claim 5.

7. A virtual space presentation method comprising the steps of:
   generating an image of a virtual space, according to a viewpoint position and a visual axis direction which are set in the virtual space;
   generating a map image representing a region around the viewpoint position, according to the viewpoint position and the visual axis direction;
   displaying the generated image of the virtual space;
   displaying the generated map image; and
   using an input unit to operate the viewpoint position and the visual axis direction, and wherein the input unit is fixed in a position on a display unit that is used in said step of displaying the map image, and
   wherein the position of the input unit on the display unit is a viewpoint position of a map image displayed on the display unit, and
   wherein said step of displaying the map image displaying includes controlling the viewpoint position and the visual axis direction, by scrolling a map image displayed on the display unit according to operation to the viewpoint position and visual axis direction input unit.

8. A computer-readable storage medium storing a program for causing a computer to execute a virtual space display method of claim 7.

* * * * *